United States Patent
Krause et al.

(10) Patent No.: US 8,937,920 B2
(45) Date of Patent: Jan. 20, 2015

(54) HIGH CAPACITY NETWORK COMMUNICATION LINK USING MULTIPLE CELLULAR DEVICES

(71) Applicants: Edward A Krause, Saratoga, CA (US); Peter A Monta, Palo Alto, CA (US); Michael Lee, Saratoga, CA (US)

(72) Inventors: Edward A Krause, Saratoga, CA (US); Peter A Monta, Palo Alto, CA (US); Michael Lee, Saratoga, CA (US)

(73) Assignee: UV Networks, Inc., Cupertino, CA (US)

( * ) Notice: Subject to any disclaimer, the term of this patent is extended or adjusted under 35 U.S.C. 154(b) by 167 days.

(21) Appl. No.: 13/731,102

(22) Filed: Dec. 30, 2012

(65) Prior Publication Data

US 2013/0170451 A1   Jul. 4, 2013

Related U.S. Application Data

(60) Provisional application No. 61/582,196, filed on Dec. 30, 2011.

(51) Int. Cl.

| | |
|---|---|
| H04W 4/00 | (2009.01) |
| H04W 72/12 | (2009.01) |
| H04L 29/06 | (2006.01) |
| H04W 92/02 | (2009.01) |
| H04W 80/06 | (2009.01) |
| H04W 84/22 | (2009.01) |
| H04L 12/803 | (2013.01) |
| H04L 12/851 | (2013.01) |
| H04W 88/04 | (2009.01) |

(52) U.S. Cl.
CPC .......... *H04W 72/1231* (2013.01); *H04L 69/14* (2013.01); *H04W 92/02* (2013.01); *H04W 80/06* (2013.01); *H04W 84/22* (2013.01); *H04L 47/125* (2013.01); *H04L 47/24* (2013.01); *H04W 88/04* (2013.01)
USPC ........................................................ 370/329

(58) Field of Classification Search
CPC ................................................ H04W 72/1231
USPC ........................................................ 370/329
See application file for complete search history.

(56) References Cited

U.S. PATENT DOCUMENTS

| 6,577,644 B1 | 6/2003 | Chuah et al. |
| 6,611,231 B2 | 8/2003 | Crilly, Jr. et al. |

(Continued)

FOREIGN PATENT DOCUMENTS

| EP | 1067746 A2 | 10/2001 |
| EP | 1249119 B1 | 10/2002 |
| RU | 2357374 C2 | 5/2009 |

OTHER PUBLICATIONS

International Search Report in application PCT/US 2012/072247 mailed Apr. 4, 2013 and Written Opinion of the International Searching Authority in application PCT/US 2012/072247 mailed Apr. 4, 2013.

(Continued)

*Primary Examiner* — Wei Zhao

(74) *Attorney, Agent, or Firm* — Patents and Licensing LLC; Daniel W. Juffernbruch

(57) ABSTRACT

An agent manages multipath communications between a first network and a second network. The first network and a second network are wirelessly coupled by links through a plurality of wireless cellular devices. A link status monitor maintains a list of wireless cellular devices with bridging capability available for multipath communications between the first and second networks. A packet scheduler identifies segments of received packets originating from the second network and assigns one or more wireless cellular devices selected from the list to the identified segments. A packet transmitter encapsulates the segments of packets so identified and addresses the encapsulated segments to the assigned wireless cellular devices.

40 Claims, 18 Drawing Sheets

(56) References Cited

U.S. PATENT DOCUMENTS

| | | |
|---|---|---|
| 6,674,741 B1 | 1/2004 | Rasanen |
| 7,292,584 B1 | 11/2007 | Rautiainen et al. |
| 7,412,257 B2 | 8/2008 | Loveland |
| 2008/0176588 A1* | 7/2008 | Ashdown et al. ............. 455/466 |
| 2011/0286366 A1* | 11/2011 | Kizhnerman ................. 370/260 |

OTHER PUBLICATIONS

Elglish languiage abstract for RU 2357374 dated May 27, 2009.

* cited by examiner

HIGH CAPACITY NETWORK COMMUNICATION LINK USING MULTIPLE CELLULAR DEVICES

BACKGROUND OF THE INVENTIONS

1. Technical Field

The present inventions relate to clients on networks and, more particularly, relate to connectivity between two networks using one or more wireless client devices as bridges.

2. Description of the Related Art

A Wireless Access Point typically serves as a bridge between wireless client devices and a wired network. The client first establishes a connection with the access point using Wi-Fi, Bluetooth or related standards and is then able to communicate with other devices on the same network. Typically this network not only offers connectivity to local area devices, but a path to the wide area network known as the internet. Access points which provide internet connectivity to Wi-Fi clients are also known as hotspots.

A block diagram of a conventional hotspot is shown in FIG. 1. Client devices 100 establish a Wi-Fi connection with hotspot 150 via Wi-Fi links 110. The hotspot is also connected to the internet 120 either by wired link 130 or wireless link 131. The hotspot enables internet connectivity to each client by forwarding data received from Wi-Fi links 110 to internet link 130 or 131 and by forwarding data from internet links 130 or 131 back to the client devices via Wi-Fi links 110.

In some cases, the hotspot may itself be a mobile device such as a smart phone. In this case, the wired link 130 to the internet would not exist and wireless link 131 would typically be in the form of a cellular wireless standard such as 3G, 4G, or a similar standard based on evolved technology. Unfortunately, the data rates offered by cellular wireless standards tend to be relatively slow and inconsistent while coverage may vary widely from one location to another. Even at times when satisfactory coverage does exist, existing hotspots are ineffective at identifying and responding to traffic with varying priorities such as the units of real-time video or audio streams which must be delivered to their destinations in accordance with specific deadlines.

Typically, communications speeds are limited by the throughput of internet link 130 or 131, which is generally slower than the rates achieved over the local wireless network. One way to increase the speed of communication is to establish and combine multiple links between a local network and the internet, such as described in U.S. Pat. No. 7,292,584 (corresponding to EP 1249119) and U.S. Pat. No. 6,577,644 (corresponding to EP 1067746). However, not only is it difficult, or at best inconvenient to create new links to the internet, the objective of achieving efficient utilization on each link is difficult using prior art methods. The loss in efficiency becomes even more serious when attempting to compensate by further increasing the number of links, particularly when the capabilities of each individual link is highly variable, depending on signaling conditions and network congestion.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

An alternative networking structure employing multiple wireless links between a local area network and a wide area network such as the internet is introduced. Since the methodology is particularly well-suited for the mobile hotspot application, it will be described primarily with respect to local area networks comprising a hotspot, including one or more wireless client devices. However, the inventions are not limited to such specific local area networks, and similarly, the wide area network is not limited to the internet. In fact, the wide area network could also be a second local area network without modification of the methods to be described and illustrated by way of example.

Figure 1:
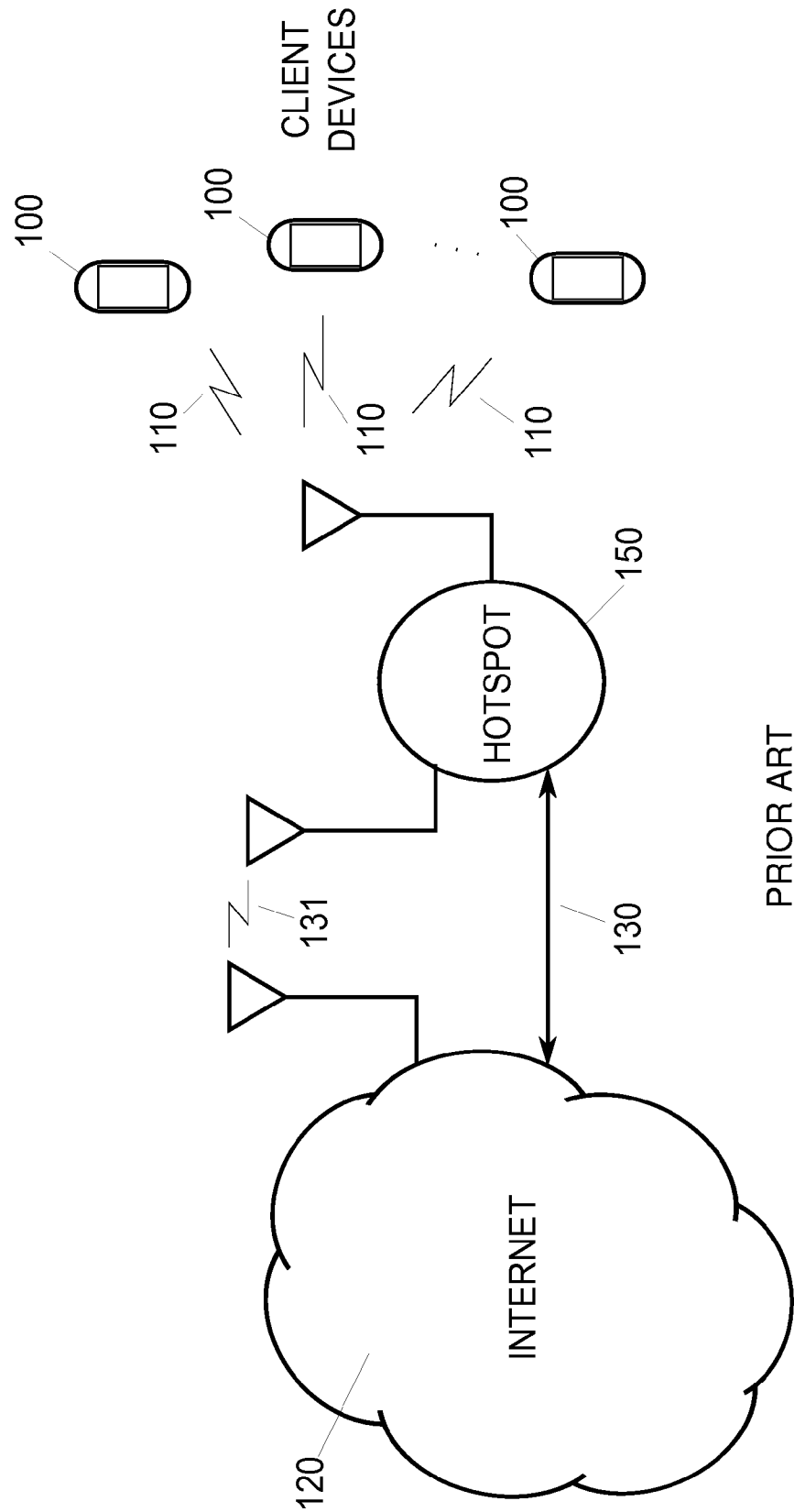
FIG. 1 illustrates a diagram of a conventional hotspot providing connectivity to client devices using a single wired or wireless link to the internet according to the prior art.

The alternative networking structure enables internet connectivity to multiple clients at much higher data rates and on a more consistent basis while utilizing the same cellular links as the prior art example in FIG. 1. The advantages are most pronounced when used for high-bandwidth applications such as real-time video transfers, either to or from a client device. In addition, the solution offers inherent advantages related to the cost of operation when compared with alternative options.

Figure 2:
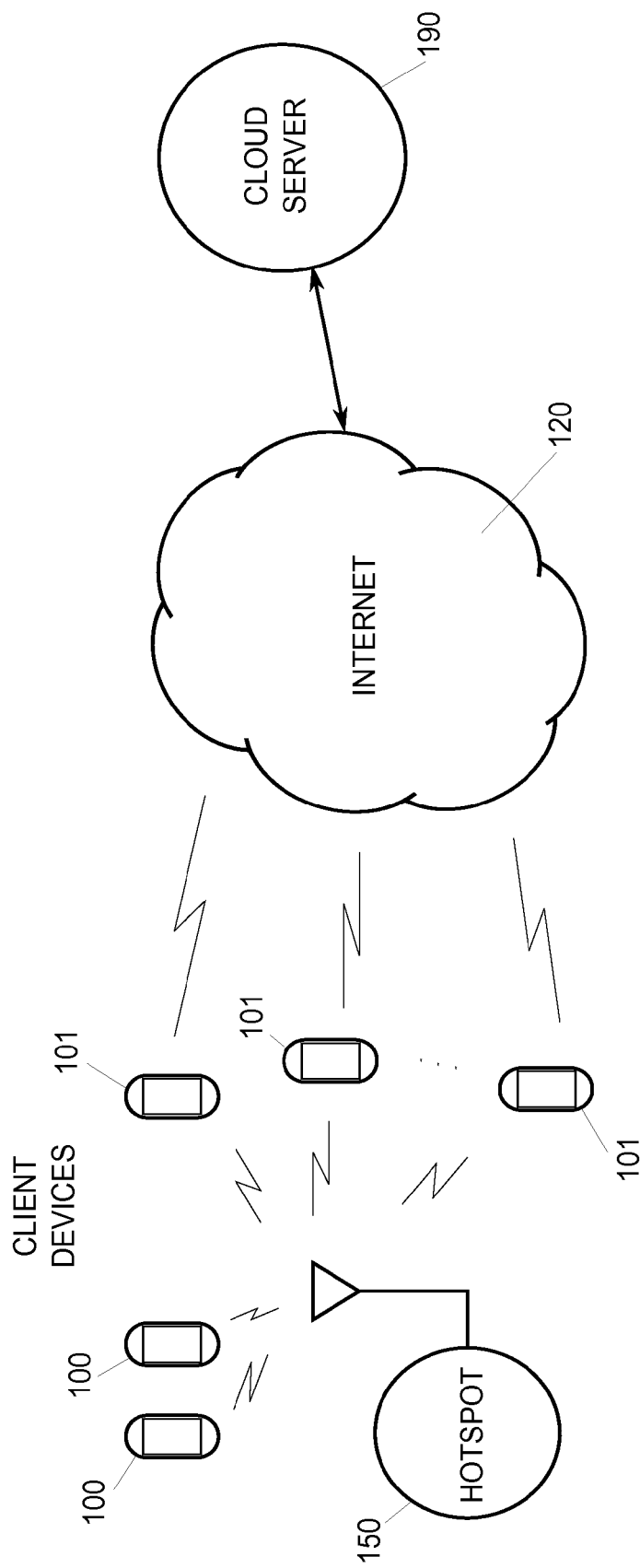
FIG. 2 illustrates a diagram of an alternative hotspot implementation having no dedicated link according to one or more embodiments of the present inventions.

An alternative hotspot implementation is depicted in FIG. 2. Unlike the prior art design in FIG. 1, there is no longer a dedicated link between the hotspot device 150 and the general internet 120. In fact, no such connectivity exists until the first compatible client device 101 connects to the hotspot. This connection may be established using Wi-Fi in the conventional manner. Once the connection is established, hotspot 150 will establish a network tunnel to a cloud server 190 which may reside at any convenient location within the internet cloud. In this case, the cloud server becomes the gateway to the internet, although it is the client device providing the internet connectivity.

Not all client devices are capable of providing internet connectivity. In addition to establishing a wireless connection to the hotspot, the device must also be capable of establishing and maintaining a second connection to the internet, typically using the cellular network of an associated mobile operator. Perhaps the ideal client devices suitable for this application are the smart phones that are prevalent at this time. These devices support Wi-Fi connections to access points as well as cellular data connections to a mobile network of an associated carrier. In addition, these devices may be customized by executing software applications designed to enable new capabilities and features. The processes of forwarding data between the Wi-Fi port and the mobile network port may be implemented as a software application.

In contrast to the prior art hotspot in FIG. 1, internet connectivity is not achieved until the first client 101 establishes a connection and initiates an application to bridge the Wi-Fi and mobile network ports. Fortunately, there is little need for internet connectivity if there are no clients to make use of it. However, as new clients connect to the hotspot, the demand for internet bandwidth is likely to increase. As shown in FIG. 2, additional clients 101 may also connect to the system and as they begin to forward traffic between their own Wi-Fi and mobile network ports, the internet throughput increases in proportion to the throughput of each individual connection. For example, if there are three client devices 101 each providing a respective upload data rate of 1 mb/s, 5 mb/s, and 2 mb/s and a respective download data rate of 5 mb/s, 10 mb/s, and 1 mb/s, then the overall upload data rate will be 8 mb/s and the overall download data rate will be 16 mb/s. This result is likely to vary as a function of network loading, and reception conditions, but this is another benefit of the multilink solution. Not only does the bandwidth increase as additional clients join the system, but the tolerance for signal variation also improves due to the statistical averaging effect which compensates for fluctuations in signal quality and network performance which may vary independently from one client device to the next, particularly when multiple carrier networks are involved.

In the example of FIG. 2, client devices 101 are assumed to be capable of forwarding traffic between hotspot 150 and cloud server 190. However, the hotspot may also provide a service to wireless devices which are incapable of operating in this mode, either due to hardware omissions or software limitations. These devices (for example client devices 100 in FIG. 2) may still establish connectivity with hotspot 150 and benefit from the internet connectivity provided by client devices 101.

Although the primary invention relates most directly to the use of wireless client devices operating as bridges to the wide area network known as the internet, it should be emphasized that the same methods are applicable to hybrid combinations consisting of one or more wireless client bridges, as well as one or more conventional links offering similar connectivity. For example, such conventional links may be in the form of Wi-Fi connections or they may exist in the form of standardized wired interfaces such as ethernet.

It may now be apparent that cloud server 190 is essential for another reason. If one or more internet data streams are partitioned and conveyed by multiple client devices, then the result is a collection of disjointed network streams that cannot be processed by receiving systems at the intended internet destinations. The solution is to assign a sequence number to each stream segment and to address all segments to a common cloud server device. Although each segment may take a different path depending on the assigned client bridge device 101, they will all end up at the same cloud server. The cloud server collects each segment and uses the sequence numbers to reconstruct the original stream as it existed at hotspot 150 prior to partitioning, before forwarding the data to the intended internet destination. Typically, a response is then returned from the destination back to the client which initiated the request. This response is first received by the cloud server 190 which correlates the response with the intended client. As with the outgoing stream, the response message may also be subjected to the same segmentation process and forwarded to hotspot 150 via one or more client bridge devices 101. The hotspot collects and reconstructs the response from the one or more segments before forwarding the reconstructed message to the intended client device.

Figure 3:
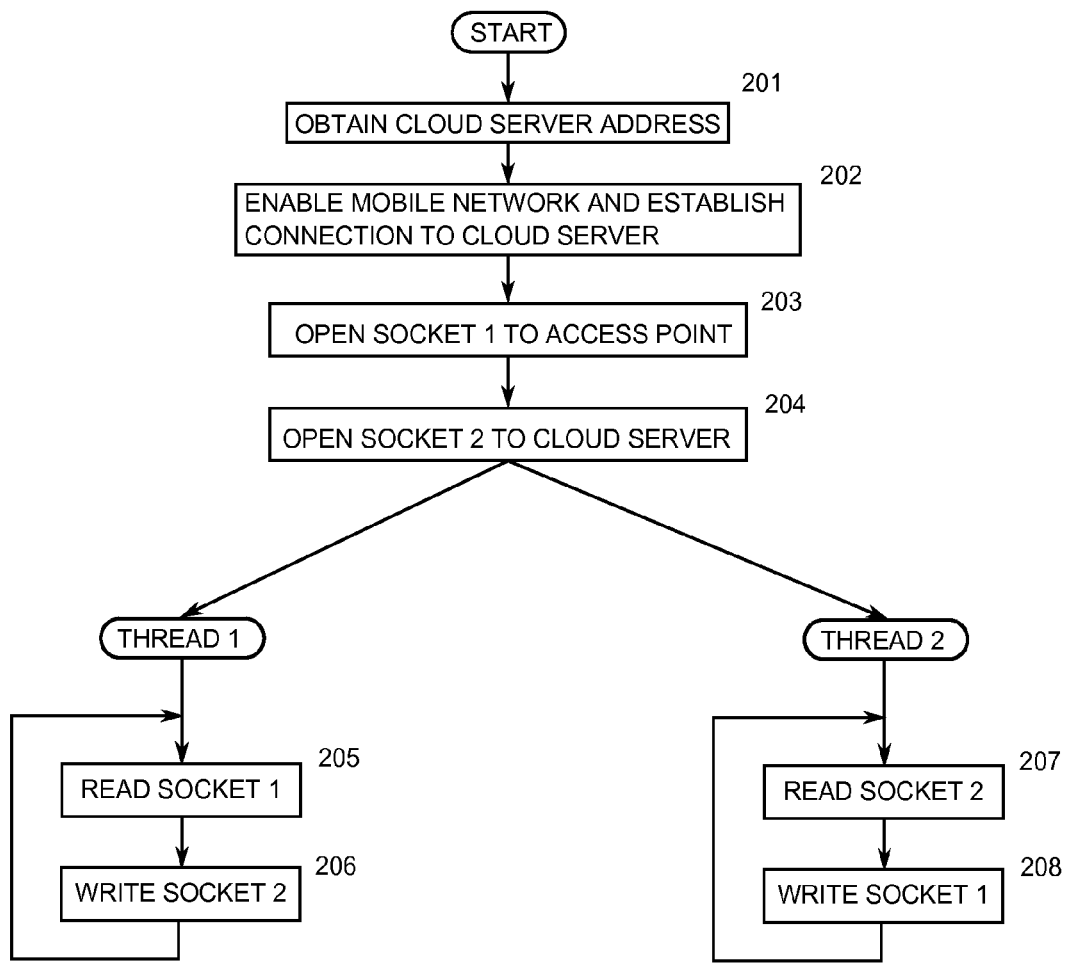
FIG. 3 illustrates a flow chart diagram of an exemplary method on client device serving as a bridge between hotspot and cloud server according to one or more embodiments of the present inventions.

An example of a software application executed on client device 101, thereby enabling the device to serve as a bridge between hotspot 150 and cloud server 190, is outlined in FIG. 3. The application would typically be executed on a client device upon establishing a connection to a suitable access point such as hotspot 150. The first step 201 is to determine the internet address of the cloud server before proceeding. This information can be obtained by querying hotspot 150 or a default internet site, where a short list of suitable cloud servers can be maintained and updated from time to time. The most suitable cloud server may be determined as a function of geographic proximity, current loading conditions, and availability. If one cloud server fails, then a second server should always be ready to take its place.

The next step 202 is to enable the interface to the cellular network associated with the mobile carrier, as this interface is typically disabled while the Wi-Fi interface is active. Note that the ability to perform this operation may depend on the operating system that is running on the client device, access privileges, and the APIs that are made available to developers. For example, recent releases of the Android operating system permit the enabling and disabling of the mobile network by a user-supplied software application, however, the connection is restricted to a limited number of internet destinations. In this case, connectivity only needs to be established with cloud server 190 so this restriction is not a problem. Note that this is only one of several benefits relating to the use of a cloud server as will become apparent later on.

The client then establishes a first dedicated socket connection to hotspot 150 at step 203 and a second dedicated socket connection to cloud server 190 at step 204. The User Datagram Protocol (UDP) is well suited for these socket connections which serve as tunnels for forwarding network traffic between hotspot 150 and cloud server 190.

The client application next launches a first thread for receiving network data from hotspot 150 at step 205 and subsequently forwarding the data to cloud server 190 at step 206. The client application also launches a second thread for receiving network data from cloud server 190 at step 207 and forwarding this data to hotspot 150 at step 208. Both threads are active simultaneously in order to minimize delays and receiver buffering requirements at steps 205 and 207.

Figure 4:
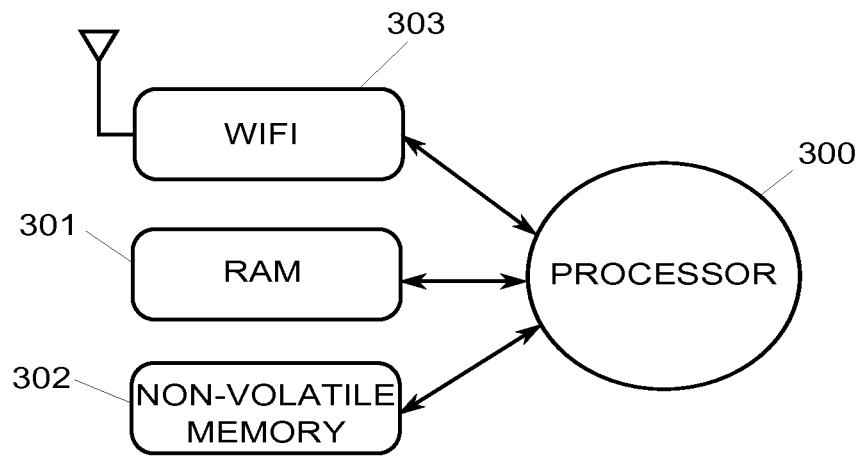
FIG. 4 illustrates a block diagram of one particular embodiment of the hotspot device according to one or more embodiments of the present inventions.

A block diagram showing the hardware components comprising a particular embodiment of the hotspot device is provided in FIG. 4. The major components include a processor 300, Random Access Memory (RAM) 301, non-volatile memory (302) and at least one network device 303. Assuming the current state of technology, the processor may be an ARM CPU device clocked at 1 GHz or less, assuming that the software processes are implemented efficiently utilizing DMA for all major data transfers. Approximately 128-256 Mbytes of RAM is sufficient for use as a temporary file system as well as general buffering functions such as network stream segmentation, reconstruction, retransmissions, error protection and interleaving. Non-volatile storage may be in the form of flash memory or rotating magnetic media and is used for storing the operating system, application software, persistent settings, and optionally for buffering certain network streams such as will be described in a following section related to video optimizations. In this example, network device 303 is assumed to be a common Wi-Fi module, commonly implemented as complete units, often with multiple radios and PCIe interfaces. Additional wired or wireless network interfaces may also be present to enable traditional access point features such as network routing, bridging and firewalls, but this is not essential for operation as a hotspot.

Figure 5:
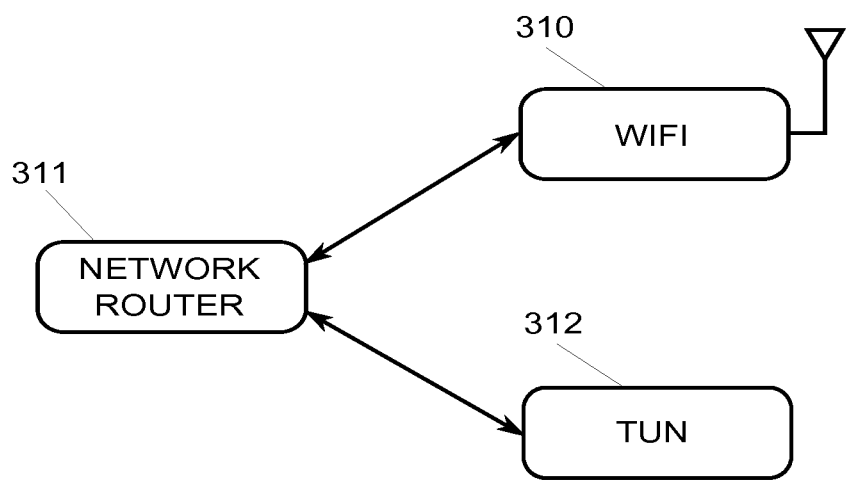
FIG. 5 illustrates a block diagram of the functional networking components of a hotspot device according to one or more embodiments of the present inventions.

A second block diagram, this time illustrating the functional networking components of the hotspot device, is shown in FIG. 5. In this case, all incoming and outgoing network traffic is passed through Wi-Fi module 310 and network routing module 311. Both of these modules are conventional and therefore will not be described in any detail. The network router simply examines the header of incoming IP packets and is configured to forward packets to Wi-Fi module 310 if the IP destination falls within the subnet assigned to the wireless client devices. All other packets are forwarded to a tunnel (TUN) module 312.

Although TUN module 312 behaves as a network device and interfaces to network routing module 311 in the same way that the network routing module interfaces to Wi-Fi module 310, the TUN module is not a true networking destination. Instead, the TUN module receives network packets, processes them and then returns them back to the network router. The TUN module is the source of the tunnel from the hotspot to cloud server 190 as well as the termination point of the corresponding tunnel from the cloud server back to the hotspot. The operation of the module will be described with relation to a single network packet originating from a client device on the hotspot subnet.

IP packets may be generated by any of client devices 100 or 101 in FIG. 2. These packets are received at Wi-Fi module 310 in FIG. 5 and forwarded to network router 311. The network router examines the IP destination address in the IP packet header and will forward the packet back to Wi-Fi module 310 if the destination address matches an address on the local subnet, or forward the packet to TUN module 312 if the address does not match any address on the local subnet. Typically, packets generated by local client devices will be addressed to destinations on the external internet, and therefore such packets will be forwarded to TUN module 312.

Figure 6:
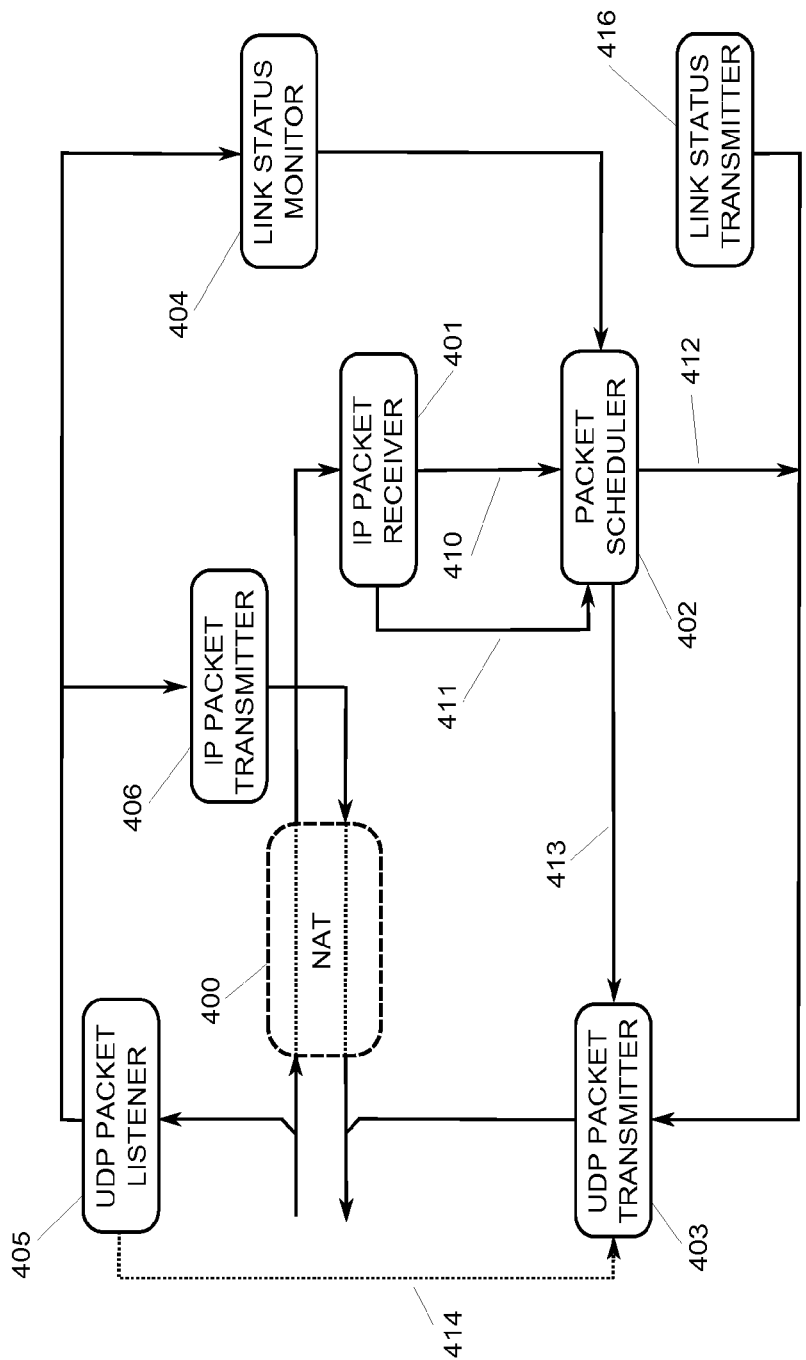
FIG. 6 illustrates a block diagram of an implementation of TUN module according to one or more embodiments of the present inventions.

A functional block diagram of a possible implementation of TUN module 312 is shown in FIG. 6. In this case, packets received from the output stage of the network router are first processed by Network Address Translation module 400. Network Address Translation (NAT) is a well-known process to those skilled in the art and is commonly used to modify source address information in IP packets generated by devices on private IP networks. Otherwise, if the packets were simply forwarded to the external internet destination in an unmodified state, it would not be possible to return a response to the client since the private IP source address still present in the packet header would not be routable as a valid destination on the public internet. In this particular embodiment, NAT module 400 is conventional in design, but the application is somewhat different. At this stage of processing, it is useful to insert a tag into each IP packet which will uniquely identify the hotspot module to the cloud server which will eventually receive the packet. The same cloud server may be receiving packets from many different hotspots and will use the tag not only as a means for addressing response packets back to the appropriate hotspot, but perhaps also as a means for authentication and accounting. On the other hand, it is not useful for the cloud server to be aware of the identity of the local client devices which may have generated the packets. Instead the NAT module will retain this information and this will be sufficient for delivering any response packets back to the corresponding client devices.

As a clarification, the modified source address inserted by NAT module 400 may not be sufficient to uniquely identify a particular hotspot to a particular cloud server since a conventional NAT implementation will insert the IP address corresponding to the address of the associated network device. In this case, the associated network device is TUN module 312, and the IP address assigned to this module must be chosen such that it cannot conflict with any other network address that may be encountered at network routing module 311. Therefore a private IP address would typically be assigned since such addresses cannot be received from external internet sources. However, depending on the scale of deployment, the range of available private addresses may be insufficient to uniquely identify the entire population of hotspot devices, or perhaps a more flexible identification method is simply preferred. Therefore the preferred embodiment of this invention is to adopt an independent identification process during the initial step of establishing a connection between hotspot and cloud server. For example, the hotspot could present an encrypted representation of its own serial number to the cloud server, and the cloud server could provide a similarly encrypted response consisting of a private network address to be assigned to TUN module 312. In this case, the range of private network addresses need only be unique to the individual cloud server that is allocating the addresses. Each allocated address would then persist as long as the connection is maintained.

Once processed by NAT module 400, incoming packets are subsequently forwarded to IP packet receiver module 401. This module simply accepts the entire IP packet beginning with the IP header followed by the packet payload. The module also assigns a priority to each packet, by examining identifiers in the packet header, or in the simplest case by recording the current system time. In the latter case, a lower time value would imply higher priority. A method for deriving a more useful priority indication will be disclosed in a later embodiment targeting live streaming of video and audio.

Packet priority indicators are forwarded from IP packet receiver 401 to packet scheduler 402 using link 411 while the IP packets are forwarded using link 410. Note that implementation efficiency can be improved by merely forwarding packet tags or packet headers via link 410, while the packet data remains in main memory. The packet scheduler also receives link status information from link status monitor 404, and uses this information to select a route to the cloud server 190. This determination only involves the selection of the client bridge device 101 in FIG. 2 to be assigned to a particular packet. This determination is based on the inferred packet priority as well as observed link performance, congestion, and latency information that is inherent in the information provided from link status monitor 404. The destination IP address of the selected client device is then signaled to UDP packet transmitter module 403 via link 413 while the IP packet (or packet identifier tag) is forwarded via link 412.

Figure 7:
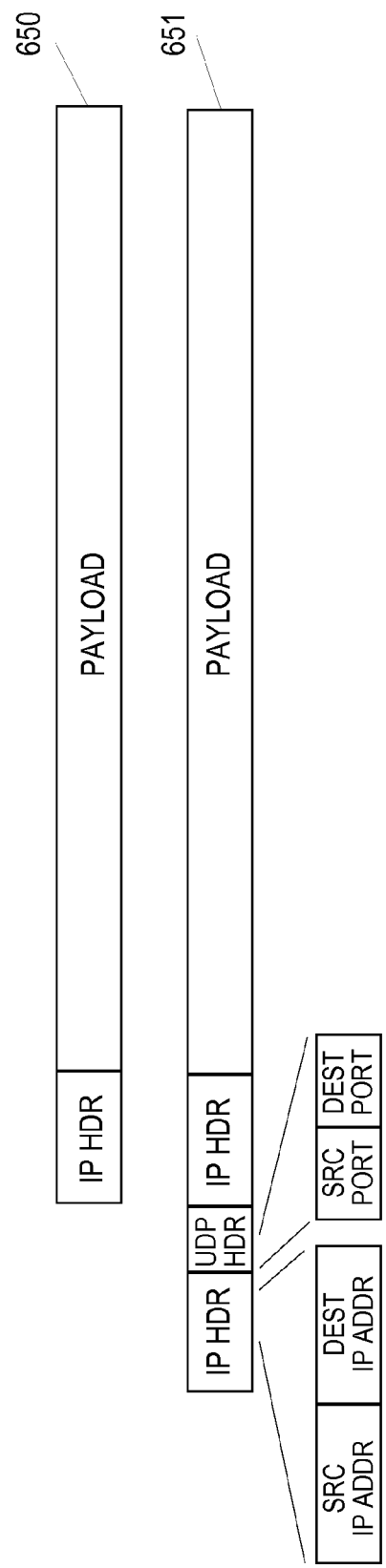
FIG. 7 illustrates a diagram of an IP packet encapsulated inside of another IP packet according to one or more embodiments of the present inventions.

Although UDP packet transmitter module 403 is conventional, it must be noted that the resulting output is an IP packet encapsulated inside of another IP packet. This is illustrated in FIG. 7 with the module input 650 depicted above the module output 651. Note that the UDP packet transmitter merely inserts a new IP header followed by a UDP header. The destination-address field of the IP header is filled in with the address of the selected client bridge device 101 and the destination-port field of the UDP header is filled in with the same reserved port number corresponding to the listener for socket 1 at step 205 of the client device flow chart in FIG. 3. The resulting packet is then forwarded from UDP packet transmitter 403 back to network router 311 in FIG. 5 which determines that the packet is to be forwarded to Wi-Fi module 310, based on the destination-address field in the new IP header. The packet is subsequently transmitted wirelessly to the selected client device where it is subjected to the Wi-Fi-to-mobile-network forwarding process that was described previously with respect to FIG. 3. The packet is then released to the mobile network of the associated cellular carrier where it is likely to be subjected to additional NAT processing before emerging on the public internet. At this stage, the packet still carries the publicly-routable IP destination address corresponding to cloud server 190 that was assigned at step 206 of the client device flow chart in FIG. 3.

Figure 8:
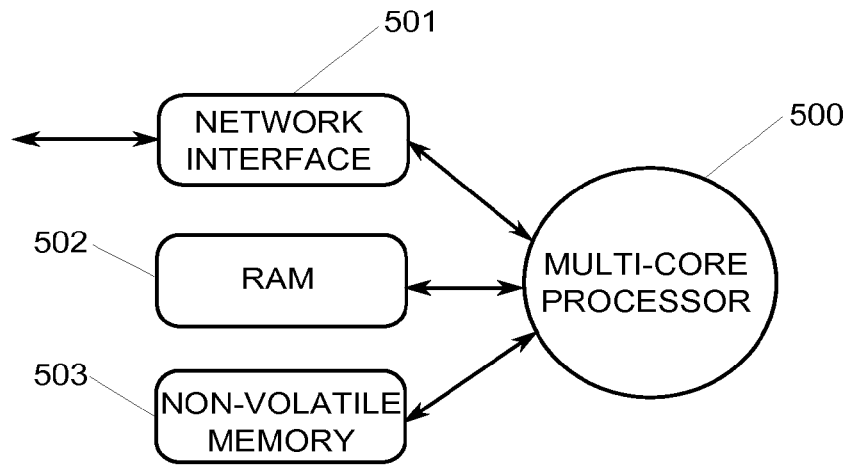
FIG. 8 illustrates a block diagram of one particular embodiment of the cloud server according to one or more embodiments of the present inventions.

Cloud server 190 is functionally similar to hotspot 150; however, the hardware is now optimized for a different purpose. Instead of the power efficiency optimizations essential for achieving long battery life during mobile usage, the cloud server is more likely to be optimized for the purpose of simultaneously processing many streams to and from multiple hotspot devices. Instead of a power-efficient ARM processor, a much faster multi-core processor 500 may be used as shown in FIG. 8. Instead of a wireless network interface, a high speed wired network device 501 can offer much faster network access, particularly if the server is located at a site offering direct access to the internet backbone. RAM memory module 502 and non-volatile memory module 503 may also be functionally similar to their hotspot counterparts, but are provided here in much higher quantities in order to keep up with increased processing demands.

Figure 9:
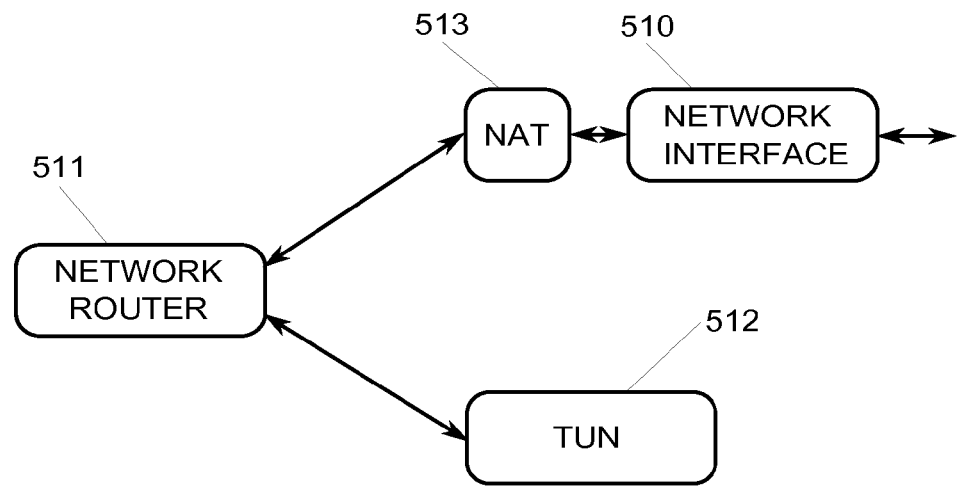
FIG. 9 illustrates a diagram of the functional networking components of the cloud server according to one or more embodiments of the present inventions.

The functional version of the cloud server block diagram is shown in FIG. 9 and is very similar to the hotspot version of FIG. 5. However there is one notable difference in configuration. In this case, the private subnet address is assigned to the TUN module and all other address are now forwarded by network router 511 to the network interface module 510. This is the reverse routing table assignment when compared to the hotspot device. In addition, the Network Address Translation module 513 is now associated with network interface module 510 instead of TUN module 512. The TUN module is otherwise unchanged and is represented by the block diagram in FIG. 6, but with the NAT module omitted.

Packets originating from client devices and forwarded to the cloud server via an associated hotspot are detected at the input of network interface 510. Although these packets are forwarded to network router 511, they are picked up by UDP listener module 405 in FIG. 6 before they can be subjected to the routing process. Note that the listener module must be configured to detect UDP packets with the same UDP destination port that was assigned to socket 2 at step 206 of FIG. 3 depicting the packet forwarding process implemented on client devices 101. UDP listener module 405 examines the packet header to determine if the packet is a link status packet to be delivered to link status monitor module 404, or a conventional packet to be delivered to IP packet transmitter module 406. In either case, the UDP listener module will discard the IP packet header that was inserted by UDP packet transmitter 403 of an associated hotspot device. This is illustrated in FIG. 7, this time with the incoming encapsulated packet 651 displayed below the outgoing packet 650. The IP header of the shortened output packet now contains the external internet address in the destination field and the identifier associated with the originating hotspot device in the source address field. The cloud server may choose to reject and discard the packet if the hotspot identifier is determined to be invalid or unauthorized. Assuming that the packet is not rejected, and assuming that the source IP address is compatible with the subnet assigned to TUN device 512 (therefore, no modification necessary), then the packet is returned to network router 511 in FIG. 9 which examines the destination address in the IP header that was previously hidden within the packet payload, and determines that the packet is to be forwarded to network interface 510. However, packets taking this route are first subjected to the Network Address Translation step at 513, where the source address information is modified to include the publicly-routable IP address that is associated with the particular cloud server unit. This step is necessary since the preexisting source address, although useful for identifying the hotspot device to the cloud server, does not include the essential information needed for a response to find its way back to the cloud server. Finally, the packet is emitted from the cloud server and returned to the external internet.

Eventually the packet should be delivered to the intended internet destination and eventually a response may be generated in the form of one or more IP packets to be returned to the client device (100 or 101 in FIG. 2) from which the message originated. The response is first transmitted from the internet destination after reversing the source and destination addresses extracted from the message that was received. As a result, the first step is to send the response back to cloud server 190.

Response messages returned to cloud server 190 are received at network interface 510 of FIG. 9 and then processed by NAT module 513 which identifies the packet as a response to a preceding outgoing message. In this case, conventional NAT processing involves the replacement of the destination address in the response packet with source address information previously extracted from the preceding outgoing message. The packet destination address now falls within the subnet assigned to TUN module 512 where the packet is subsequently delivered by network router 511.

The subsequent processing steps in TUN module 512 are illustrated in FIG. 6 and are similar to the steps described previously with respect to TUN module 312 in hotspot 150. IP packet receiver module 401 first receives the entire IP packet beginning with the IP header followed by the packet payload. As before, the module also assigns a priority to each packet in accordance with identifiers in the packet header, arrival time stamps, or inferred delivery deadlines. Packet priority indicators are forwarded from IP packet receiver 401 to packet scheduler 402 using link 411 while the IP packets (or tags representing the IP packets) are forwarded using link 410. The packet scheduler also receives link status information from link status monitor 404, and uses this information to select a route back to hotspot 150. This determination involves the selection of a client bridge device 101 in FIG. 2, and is determined independent of the route that was assigned to packets in the original message or the route assigned to previous packets associated with the same network stream. Instead, the determination is based on current link performance, congestion, and latency metrics that are inherent in the information provided from link status monitor 404. The destination address is then signaled to UDP packet transmitter module 403 via link 413 while the IP packet (or packet identifier tag) is forwarded via link 412.

As with the corresponding hotspot version, UDP packet transmitter module 403 is conventional and simply appends a new IP header followed by a UDP header to the existing IP frame as described previously with respect to FIG. 7. However, in this case, the destination address associated with the client bridge device 101 selected by packet scheduler 402 is assumed to be a private address isolated by NAT and firewall processes operating within the mobile network of the cellular carrier. In such cases, response messages may only be delivered to their destinations by addressing the packets to the same IP address and port number as detected in the source address fields of the packets received from the same corresponding client. This information must be maintained for all client devices associated with each hotspot serviced by the same cloud server unit. This information is forwarded from UDP listener 405 to UDP packet transmitter 403 using link 414 as shown in FIG. 6.

The encapsulated response packet is then returned to packet router 511 in FIG. 9, which determines that the packet is to be forwarded to network interface 510, based on the destination field in the new IP header. The packet is subsequently received at the selected client bridge device 101 where it is subjected to the mobile network to Wi-Fi forwarding process that was described previously with respect to FIG. 3. The packet is then transmitted using the Wi-Fi interface of the client device to the associated hotspot 150.

The process of receiving UDP encapsulated packets on the hotspot is similar to the previously-described process of receiving UDP encapsulated packets on the cloud server. On hotspot 150, response packets from cloud server 190, forwarded by a client device 101, are detected at the input of Wi-Fi module 310 in FIG. 5. Although these packets are forwarded to network router 311, they are picked up by UDP listener module 405 of TUN module 312, expanded in FIG. 6, before they can be subjected to the routing process. Note that the listener module must be configured to detect UDP packets with the same UDP destination port that was assigned to socket 1 at step 208 of FIG. 3 depicting the packet forwarding process implemented on client device 101. UDP listener module 405 examines the packet header to determine if the packet is a link status packet to be delivered to link status monitor module 404, or a conventional packet to be delivered to IP packet transmitter module 406. In either case, the UDP listener module will discard the IP packet header that was previously inserted by cloud server 190. This is illustrated in FIG. 7 with the incoming encapsulated packet 651 displayed below the outgoing packet 650.

Packets from IP packet transmitter 406 are next subjected to the reverse NAT process at step 400, where the packet is identified as a response to a preceding outgoing message. As before conventional NAT processing applies and involves the replacement of the destination address in the response packet with source address information previously extracted from a corresponding previous outgoing message. At this point, the modified packet destination address should now match the address of the client device (100 or 101) which sent the original message. Since this client exists on the Wi-Fi subnet managed by Wi-Fi module 310 in FIG. 5, the packet is forwarded to the Wi-Fi module via network router 311, and finally transmitted wirelessly to its final destination.

An example embodiment of packet scheduler component 402 of TUN module 312, in the case of hotspot 150, or TUN module 512 in the case of cloud server 190, will now be described. The same embodiment may be incorporated into both TUN implementations and depends on certain information provided by link status monitor 404. Link status monitor 404 on hotspot 150 derives link quality information from the packets transmitted from cloud server 190, while a corresponding link status monitor on cloud server 190 derives link quality information from the packets transmitted from hotspot 150. This information will also be described with respect to the packet scheduler flow chart in FIG. 10.

In this implementation, the packet scheduler attempts to achieve an optimal balance of traffic on all available communication links without consideration of the overall level of congestion. Instead, it is assumed that a global level of congestion control will be managed at the stream end-points, typically using the well-known Transmission Control Protocol (TCP) of the Internet Protocol suite. It is the responsibility of the end-point devices to manage and limit congestion as well as to detect and re-transmit any missing packets that may have been dropped along the way.

Figure 10:
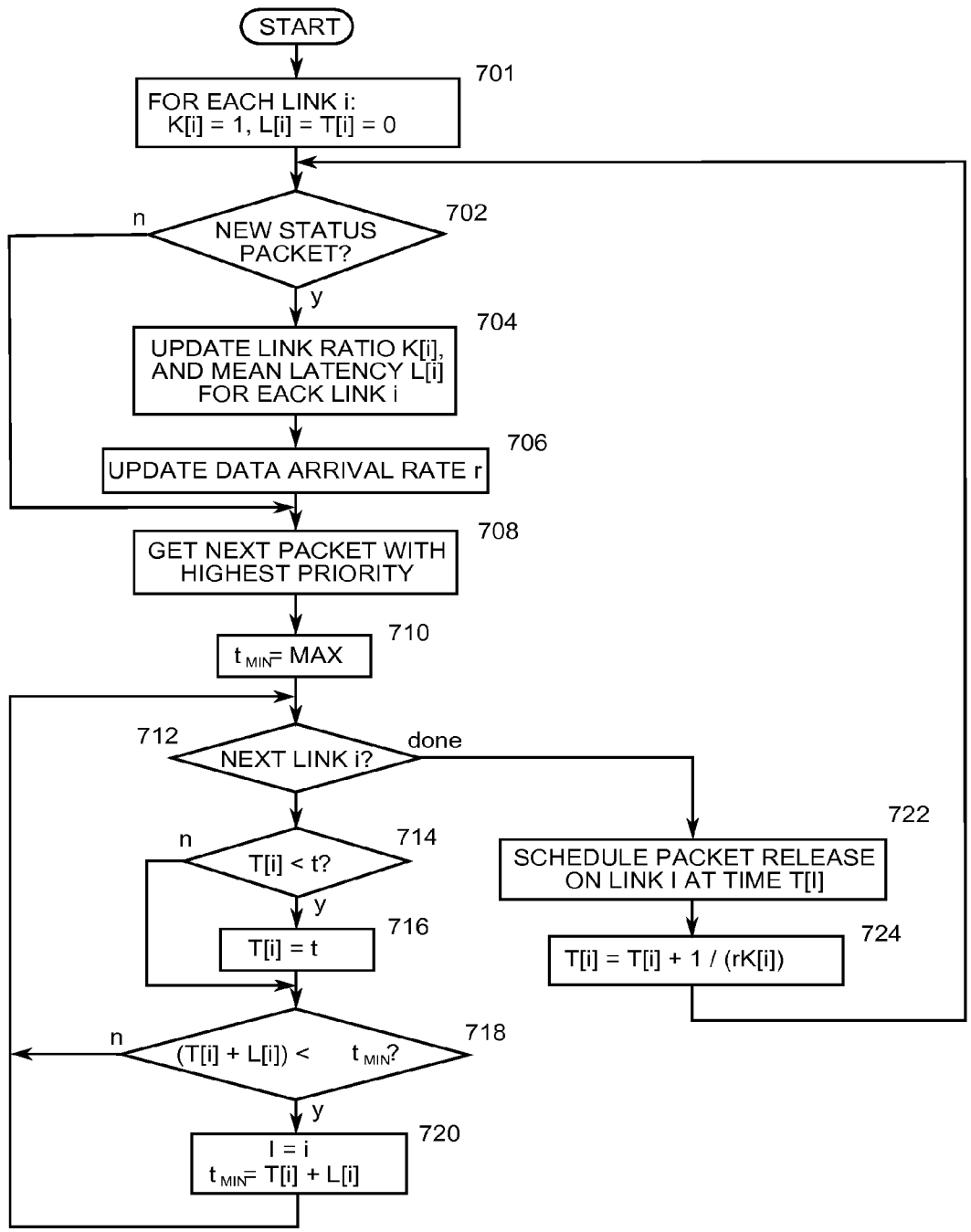
FIG. 10 illustrates a flow chart diagram of an exemplary packet scheduler method according to one or more embodiments of the present inventions.

The packet scheduler process begins by initializing parameters at step 701 in FIG. 10. T[i] represents the time when the next packet is scheduled to be released on link i, where a unique index i is assigned to each available network link enabled by corresponding client bridge devices 101. The parameter L[i] represents the expected latency between transmission and reception of a next packet on link i. The parameter K[i] represents the ratio of traffic successfully transmitted over link i to the total amount of traffic transmitted over all of the links combined. By this definition, the sum of all K[i] parameters would be equal to 1. All three parameters are easily derived from recent packet transmission statistics. For example, assuming that system time remains synchronized on both transmitter and receiver, then the latency parameter L[i] is determined at the receiver as the difference between the time of receipt and a time stamp embedded in the packet header indicating the time of transmission. Similarly, the parameter K[i] may be determined by first defining a parameter r as the total amount of data received on all available links and observing the percentage of data that was received on link i. Although both parameters L[i] and K[i] are derived at the receiver, it is the transmitter that makes use of this information as detailed in FIG. 10. Therefore, the parameters L[i] and K[i] (or the information needed to derive them) must be included in the status packet for all values of i. The status packet may be sent from the receiver back to the transmitter at regular intervals, preferably by broadcasting the same packet over all available links corresponding to each client bridge device 101.

After initialization, the main loop is entered at step 702 where it is determined if a new status packet is available from the link status monitor (404 in FIG. 6). If available, then the expected latency quantities L[i] and the link ratio quantities K[i] are updated at step 704 for each value of i, and the data arrival rate r is updated at step 706. Note that the data arrival rate is determined without reference to the information provided by the link status monitor.

Next, the pending packet with highest priority is determined at step 708, and this becomes the next packet to be scheduled. Then a loop is entered to determine the link offering the earliest expected arrival time tMIN. After initializing tMIN at step 710, the next link i is identified at step 712, and if is determined at step 714 that the next packet release time for link i is less than the current time, then this is an indication that the link may have been recently idle and therefore the release time is reset to the current time at step 716. The expected arrival time for the next packet on this link is then calculated and if it is determined at step 718 that this time precedes the most recent tMIN, then at step 720 the selected link I is reset to match the current link, and tMIN is adjusted accordingly. Once it is determined at step 712, that all links have been checked, then at step 722 the selected highest priority packet is scheduled for release on link I at time T[I]. Finally, the release time for the next packet to be assigned to this link is updated at step 724 before returning to step 702 and repeating the scheduling process for the next pending packet.

Figure 11:
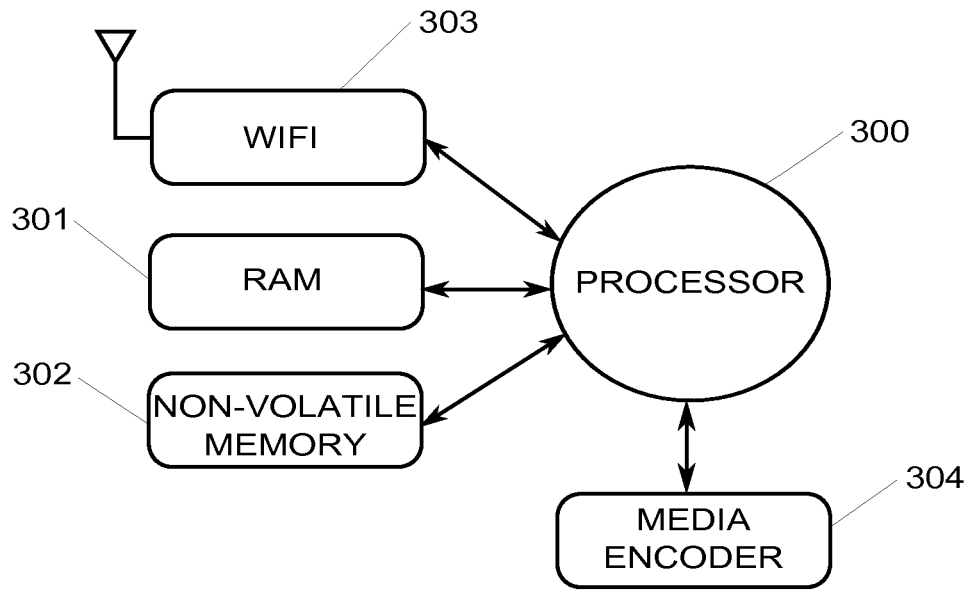
FIG. 11 illustrates a diagram of the hotspot implementation, similar to the embodiments of FIG. 4, but adding a media encoder module according to one or more embodiments of the present inventions.
Figure 12:
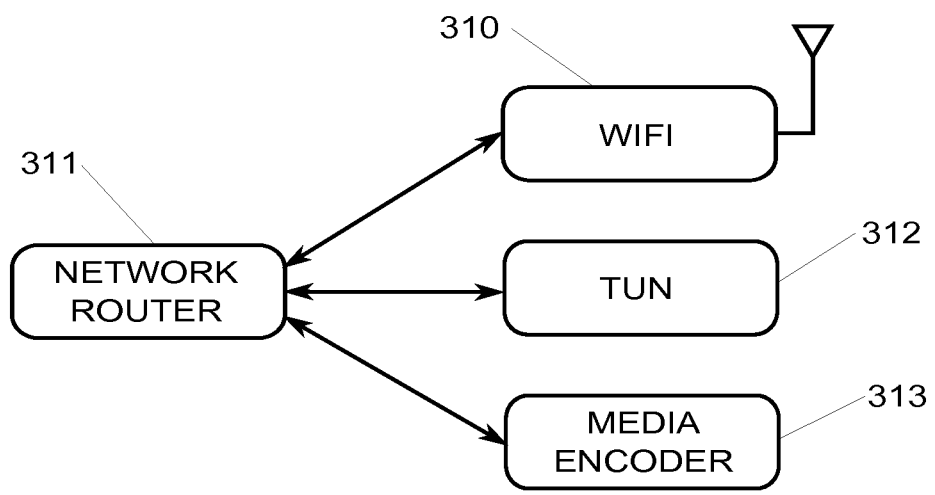
FIG. 12 illustrates a functional block diagram representation of a hotspot implementation of the embodiments of FIG. 11.

For certain applications such as the transmission of real-time video and audio, there are opportunities for further optimization. Consider the hotspot implementation in FIG. 11, which is similar to FIG. 4, but now includes media encoder module 304. The corresponding functional block diagram representation is shown in FIG. 12 including new media encoder module 313. Media encoders, and video encoders in particular, are often configured to produce large quantities of data which may easily overload the data links that are available to mobile devices. In addition, there are often strict requirements in the form of delivery deadlines for each encoded video frame representation. There are several optimizations that can be incorporated into the design of hotspot 150 and cloud server 190 that can improve the performance of the media encoding subsystem and the efficiency of the packet delivery processes.

The first optimization is to directly incorporate the media delivery deadlines into the packet prioritization process described previously with respect to IP packet receiver module 401 in FIG. 6. In many cases the delivery deadline is in the form of a time stamp that is easily extracted from the IP packet header. For example, time stamps are specified as part of the Real-time Transport Protocol (RTP) used extensively for streaming media applications such as video conferencing. Even if not present in the IP header, time stamps can almost always be extracted from the media container headers used to delineate and synchronize the audio and video sub-streams. Once the time stamps are extracted from the encoded media stream, they may be compensated if necessary to align with the local system time and then used directly as priority indicators. However, either the time stamps extracted from media streams should be biased lower, or the time stamps assigned to all non-media streams should be biased higher in order to give preference to the media streams. In addition, if it is determined that a media packet is late and the delivery deadline has expired, then the media packet may be discarded in order to avoid unnecessary congestion.

Priorities may also be assigned advantageously when accommodating the output of scalable video codecs. In this case, higher priority levels would be assigned to the output components deemed essential for reconstructing a baseline level of video quality, while lower priority levels would be assigned to the output components serving as video quality enhancement layers.

There is another important distinction to be noted when a media encoder is directly attached to the hotspot device. The hotspot now becomes a source of network traffic (ie a streaming end-point), which means that any sort of congestion, packet loss, and packet retransmission control scheme can now be implemented without complicating or destroying the efficiency of similar processes that may already be in place. For example, the Transmission Control Protocol (TCP) is typically used to manage congestion and packet loss when the traffic is originating from an external source, but TCP was not designed for multilink transmissions systems of the type that has been disclosed herein. Consider, for example, the case where a video packet is first received 0.5 seconds prior to its delivery deadline, and then transmitted to the cloud server using a selected client device as the bridge. Suppose, after 300 ms has transpired, it is determined by the underlying TCP process that the packet has not arrived at the destination, and therefore a retransmission step is initiated. However, by this time only 200 ms remain before deadline expiration, and so the packet priority is automatically increased relative to more recent packet arrivals. Therefore it would now be advantageous to reassign the packet to a link that has proven to be more capable of delivering packets with reduced risk of packet loss and with low transmission latency. Unfortunately, the networking route cannot be dynamically altered in this way once the packet has been released to the TCP process. Instead, the packet will be retransmitted along the same link as before and as many times as necessary until receipt has been verified. By the time the packet finally arrives at the receiver, it may be too late as the deadline may have expired, in which case a glitch in the video display will have already occurred. Such video disruptions have a very serious effect on network efficiency, not only because of the time wasted sending packets which can no longer be used, but also because of the large number of subsequent packet which are also rendered useless. This is a direct consequence of the video compression process. Once a single packet is lost, the video decoder is forced to discard subsequent packets, even though they may have arrived on time, while searching for a suitable entry point for resynchronization. In many non-broadcast network streaming scenarios, these entry points are few or non-existent until specifically requested by the video receiver. This is for good reason, as the resynchronization entry points compromise the efficiency of the video compression process. In order to maintain the same video quality, the data rate of the compressed video stream must be increased by a significant margin each time an entry point is introduced into the stream to enable decoder resynchronization.

The TCP protocol is often avoided in favor of UDP when streaming video over data networks, even though the multilink complication does not apply to conventional implementations. However, TCP offers a solution to the problem of network congestion management, and although the reliable delivery guarantee may be less critical for video streaming, it remains a very desirable goal. Fortunately, a process such as TCP can be adapted and optimized for video streaming applications using multilink networking between two nodes such as hotspot 150 and cloud server 190. Once, a priority scale has been assigned as described previously, the next step is to then modify the packet scheduler module in FIG. 6 which was described previously with respect to FIG. 10. Instead of releasing packets to UDP packet transmitter module 403 at step 722 of FIG. 10, the packet could just as well be released to a TCP packet transmitter module and similarly UDP packet listener 405 in FIG. 6 could be replaced by a TCP packet listener. However, the TCP process should be modified to disable automatic packet retransmissions, and instead the packet should be reconsidered by packet scheduler module 402 if delivery cannot be confirmed by the time a predetermined interval has elapsed. Note that the packet priority will have automatically increased during this time assuming that the priority is based on a time stamp corresponding to a delivery deadline. However, before the packet is reconsidered, a determination is performed to determine if the deadline has expired. If expired, the packet is discarded and packet memory is reclaimed Otherwise, if it is determined at step 708 of FIG. 10 that this is the next highest priority packet, then the process of determining the most suitable link for retransmission is repeated while taking the increased priority level into consideration.

A preferred alternative to modifying the implementation of the TCP networking stack is to implement similar capabilities on top of the UDP protocol. Acknowledgments or similar signaling indications could be included in the status packets emitted by link status transmitter 416 and received by link status monitor 404 on the receiving end for the purpose of requesting the packet retransmissions between hotspot 150 and cloud server 190. Similarly, common TCP congestion control algorithms such as Tahoe and Reno may be applied to independently adjust the packet release rate on each of the active links enabled by the client bridge devices.

This combination of load balancing and congestion management is vastly superior to existing protocols such as the Stream Control Transmission Protocol (SCTP). Although SCTP supports multi-streaming, or the capability of transmitting several independent stream segments in parallel, it does not address the problem of aggregating multiple links for the purpose of maximizing throughput and minimizing data loss.

Video image quality can be maximized through the combination of congestion control processes applied independently to each active link, a packet scheduling process to dynamically balance the traffic load across each active link, and a rate control process providing feedback to the video encoder. If the congestion control and packet scheduling processes are implemented as described previously, then the video packets will begin to back up on the hotspot device once the encoded data rate begins to exceed the maximum aggregate throughput capability of the available links. Although it would be possible to transmit the packets as fast as they are generated by the encoder, this will not help if they are dropped along the way and need to be retransmitted. However, since the video is being encoded in real-time, the preferred option is to inform the encoder to increase the rate of compression. This will lead to a reduction in video quality, but this will be much less noticeable than the disruption that would occur if packets were to be lost or not delivered in time. Similarly, if there is no backup, implying that the network is capable of delivering all of the packets that the encoder is generating, and if an increase in video quality is desirable, then the encoder is instructed to reduce the compression ratio accordingly. Such rate control loops are well known to those skilled in the art and are readily adapted to this implementation. Depending on the specific rate control algorithm, feedback may be provided in the form of time stamps corresponding to packets yet to be successfully transmitted, the total amount of data that has been generated but not yet transmitted successfully, or a combination of the two metrics.

There is an alternative to dynamic rate control of the encoded video output signal in cases where video quality is deemed more important than real-time transmission. In such cases, the video encoder may be configured to maintain at least a predetermined minimum level of video quality, and the encoded video output signal is instead collected in a memory storage device such as non-volatile memory 302 in FIG. 11. In this case, the memory not only serves as a buffer during periods when the rate of encoded output exceeds the total transmission capacity, but also maintains a high-quality permanent copy of the video signal.

Compression is a useful tool, not only for video, but other traffic as well. Lossless compression algorithms such as Lempel-Ziv-Oberhumer (LZO) can be applied to general data packets, often leading to very significant reductions in the amount of network traffic. The compression step may be introduced between the IP packet receiver 401 and packet scheduler module 402 in FIG. 6, while the corresponding decompression step may be introduced immediately before IP packet transmitter module 406.

Security may also be an important requirement in many applications. A secure tunnel is easily implemented between hotspot 150 and cloud server 190 by encrypting content either in software or by offloading the process to cryptographic engines commonly included with inexpensive system-on-chip processing devices. The packet encryption step may be introduced just before UDP packet transmitter module 403 and a corresponding packet decryption step may be introduced immediately following UDP packet listener module 405.

Figure 13:
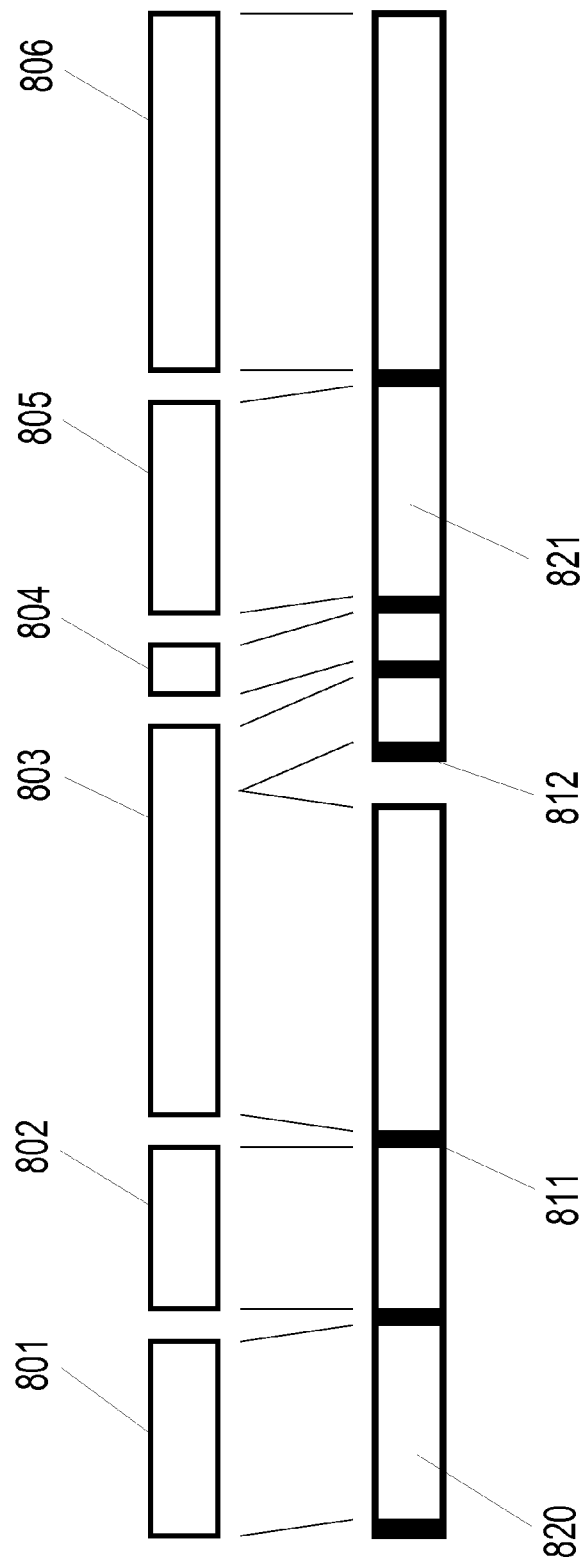
FIG. 13 illustrates a diagram of one way to improve system efficiency by coalescing multiple small packets into larger packets according to one or more embodiments of the present inventions.

Another way to improve system efficiency is to coalesce multiple small packets into larger packets as illustrated in FIG. 13. In this example, packet overhead in the form of link layer headers, CRC trailers, and the appended IP and UDP header used for encapsulation, are all reduced by combining packets 801, 802, and the first portion of packet 803 to form larger packet 820, and by combining the remaining portion of packet 803, followed by packets 804, 805 and 806 into larger packet 821. In this case, each of the smaller packets is first prepended with a small header indicating the size of the packet which follows. If the packet becomes split across two different packets, as is the case with packet 803, then this may be signaled by a first header 811 included in the first packet (820) indicating the full size of the smaller packet (803), and a second header 812 included in the second packet (821) indicating the size of the remaining portion immediately following.

Figure 14:
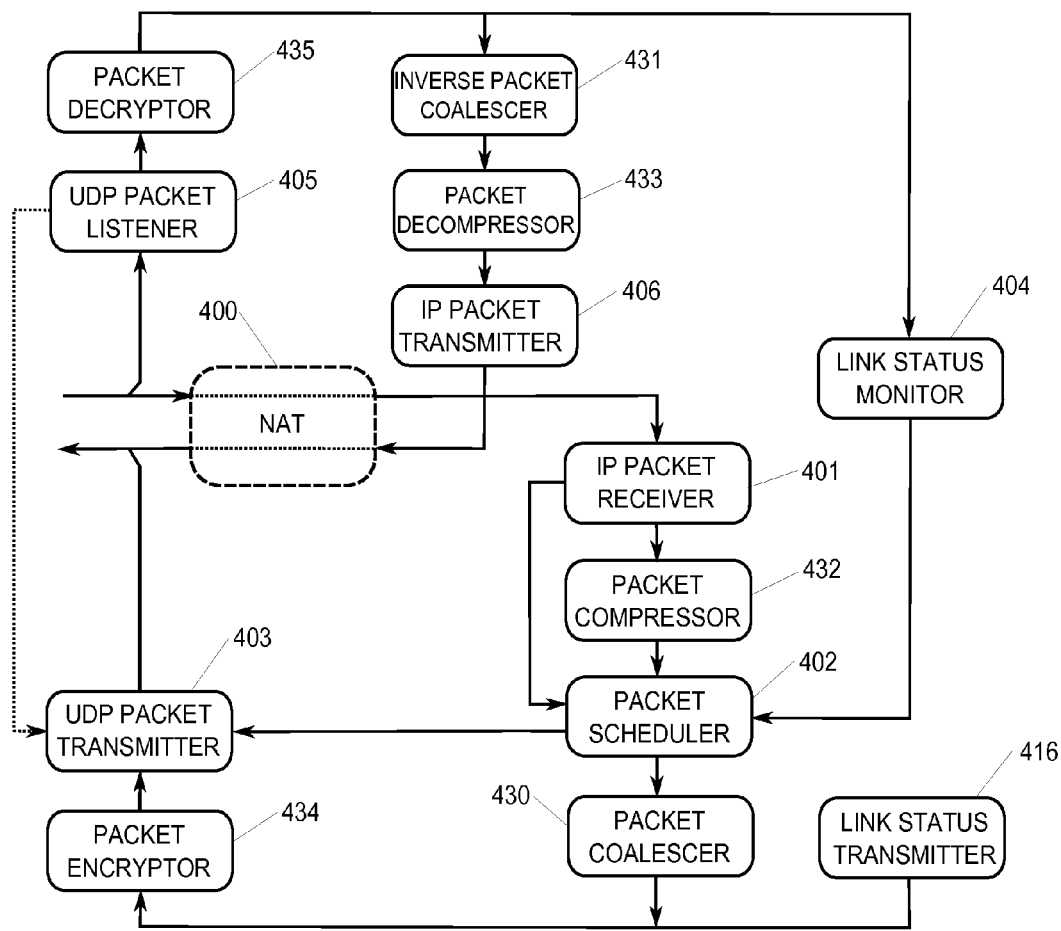
FIG. 14 illustrates a block diagram of a tunnel (TUN) module according to one or more embodiments of the present inventions.

A block diagram of TUN module (312 in FIG. 5 or 512 in FIG. 9) is provided in FIG. 14, this time include packet coalescing module 430 and corresponding inverse packet coalescing module 431, packet compression module 432 and corresponding packet decompression module 433, packet encryption module 434 and corresponding packet decryption module 435.

In practice, short packets are more likely to be encountered in applications where network traffic is predominantly in the form of general data rather than video. However, there is an additional benefit associated with packet coalescing. Certain processes, such as error correction and packet striping, become simplified and easier to implement when all packet sizes are of the same uniform size. Error correction can be an effective method of data loss prevention, particularly when packet retransmission is not an option. Conventional cyclic error-correcting codes such as Reed-Solomon are easily derived and could be appended to network packets, but unfortunately networking systems are designed to check ethernet frames for errors and will drop packets in their entirety as soon as an error is detected, thereby leaving little opportunity to apply the error-correcting code. Therefore, the error correction process must be designed with the capability of reconstructing entire missing packets. Another factor to consider is that packet loss frequently occurs in bursts. That is, when one packet is lost, there is a greatly increased probability that the next packet will be lost as well.

Figure 15:
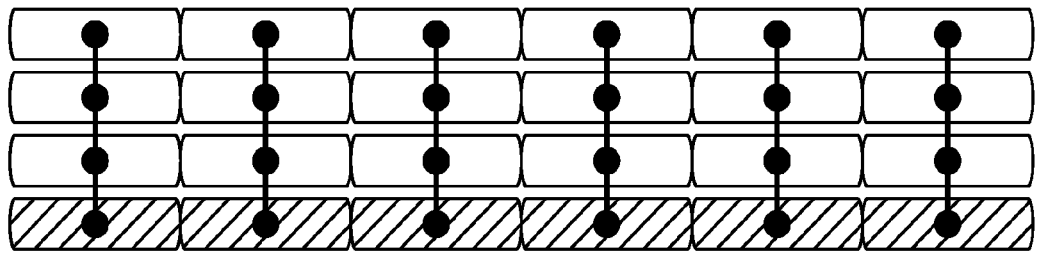
FIG. 15 illustrates a diagram of A RAID-5 striping example where each row represents a sequence of equally-sized packets assigned to one of four links enabled by four corresponding client bridge devices according to one or more embodiments of the present inventions.

Packet striping is an error-correction process that is well suited to the multilink transmission tunnel between hotspot 150 and cloud server 190. Effective packet protection is achievable without increasing latency, and deterioration in network performance is well tolerated as long as the effects remain uncorrelated across the multiple links. For example, consider the RAID-5 striping example illustrated in FIG. 15, where each row represents a sequence of equally-sized packets assigned to one of four links enabled by four corresponding client bridge devices 101. In this case, the fourth row, corresponding to the fourth link, is used as a parity channel. That is, each packet in the fourth row is generated as the XOR combination of the corresponding packet in each of the first three rows. Similar to the failed disk scenario in a RAID-5 disk striping system, it now becomes possible to reconstruct any single lost packet as long as the three corresponding packets are received successfully from each of the other transmission links.

Figure 16:
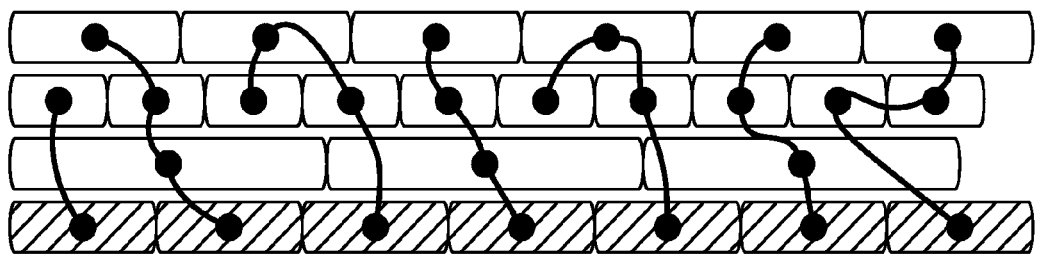
FIG. 16 illustrates a diagram of one altered striping pattern according to one or more embodiments of the present inventions.
Figure 17:
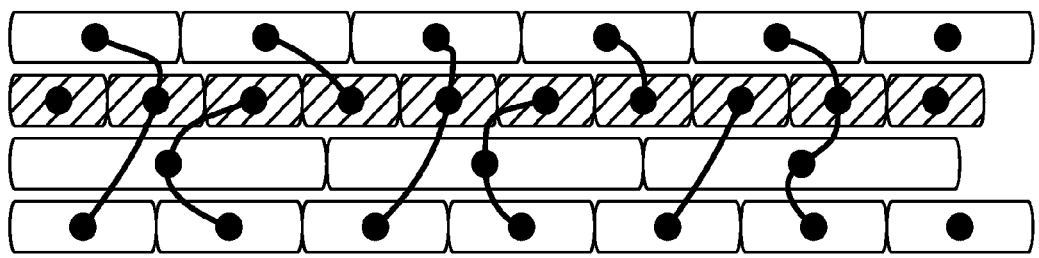
FIG. 17 illustrates a diagram of one other altered striping pattern according to one or more embodiments of the present inventions.

Unfortunately, in a properly load-balanced system the transmission data rate assigned to each channel will vary as illustrated by the varying time-slot widths in FIG. 16. In this particular state of balance, the packets allocated to the second link are transmitted at a much higher rate than the packets which have been allocated to the third link. There are many options when deciding how to stripe such a system, however, a preferred option that is easily implemented, is to alter the striping pattern as illustrated in FIGS. 16 and 17. In FIG. 16, the packets in the fourth row continue to be the parity packets, but the data packets assigned to each parity packet is now defined to include all preceding packets which have not yet been included in a preceding stripe. This increases the risk of data loss in cases where multiple consecutive packets on the same link are assigned to the same stripe, but this problem can be dealt with by temporarily reassigning the parity stream to the link that is currently operating at the highest data rate. This is illustrated in FIG. 17 where the parity stream has been reassigned to the second row, corresponding to the second link currently operating at the highest data rate. In some cases, this may result in empty parity packets as indicated by the unconnected first and last packets in the parity row. Such parity packets may be reallocated, either to form redundant stripes or converted to low-priority data packets.

Although RAID-5 was used as an example, other combinations of parity packets and data packets, including packet duplication, could be implemented just as easily. The mode can also be varied dynamically and determined by packet scheduler module 402 in FIG. 14 as a function of packet priority. For example, packets of sufficiently high priority could be offered additional protection by replicating the same packet on two or more of the available network links.

Although the detailed operation of the high-capacity network communication link has now been described, one important problem remains to be addressed. Although multiple wireless links may be aggregated to appear as a single high-capacity channel, the nature of protocols such as TCP may prevent full utilization of the available capacity. This is due to differences in behavior when the aggregated link is compared to the conventional network links comprising conventional communication networks. Specifically, a communication link formed by aggregating multiple individual links, each with different capabilities and behavioral characteristics, will exhibit a wider range in packet transmission latency, and will frequently deliver packets out of sequence. Although packet reordering buffers could be introduced to restore the proper packet sequencing, this would cause the packet latencies to diverge even further. Unfortunately when presented with out-of-order packets, protocols such as TCP will incorrectly infer that packets are being lost, and will begin to reduce the rate of packet emission. Similarly, if packet transmission latencies are highly variable and often appear to be increasing, the TCP protocol will incorrectly infer a state of increasing congestion and the result will be the same. Since the packet emission rate is determined at the source of the network connection, it cannot be directly controlled by either the hotspot 150 or the cloud server 190.

In conventional networks, TCP performance is often enhanced using Performance Enhancing Proxies (PEPs). For example, if hotspot 150 was a conventional access point, then it could be configured to operate as a proxy between wireless client devices 100 and the internet 120. Many proxies achieve improved performance by splitting each TCP connection into two separate TCP connections. This method, known as split-TCP, is easily implemented by listening for incoming TCP connections and responding as if the connections were addressed to the proxy server itself. The payload is extracted from each incoming TCP packet and then forwarded to the intended destination. That is, the incoming TCP connection is terminated at the proxy server, and a new outgoing TCP connection is established from the proxy server to the intended destination. This forwarding process is maintained for each active TCP connection using conventional networking software, implemented either in user space or in the device drivers that are always executed in kernel space.

Unfortunately, configuring hotspot 150 as a performance enhancing proxy does not solve the problem of the underutilized communication link between hotspot 150 and cloud server 190. For reasons already mentioned, the TCP protocol does not perform well when partitioned over multiple links, even if the connection is split at one or both endpoints. However, excellent performance can be achieved by terminating the TCP connections at both hotspot 150 and cloud server 190, while continuing to forward the connection payloads between the hotspot and cloud server using the optimized protocols described previously. By introducing buffers between the TCP connections and the single connection to the aggregated tunnel comprised of multiple individual links, each connection segment can be tuned to match the corresponding segment characteristics. In this example, TCP settings will adapt to the wireless connection between hotspot 150 and a Client Device (100 or 101), while an additional TCP connection will be established and optimized for the segment between cloud server 190 and an endpoint within the internet 120. At the same time, the high-capacity link comprised of prioritized UDP connections, will continue to be optimized for the segment between hotspot 150 and cloud server 190.

Figure 18:
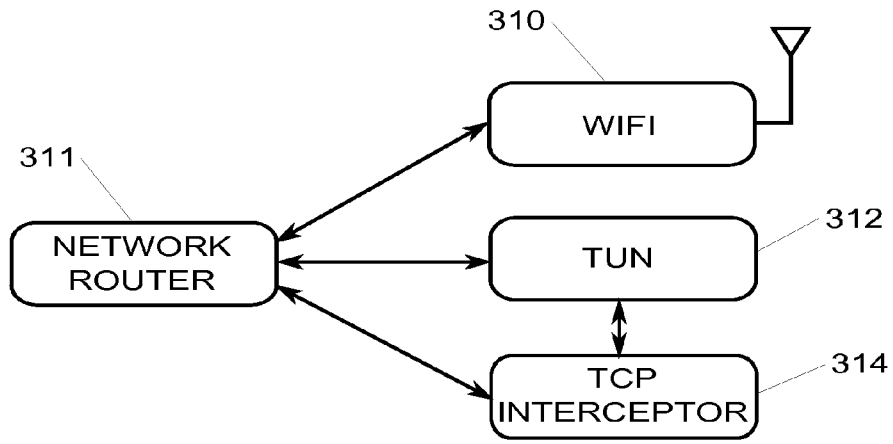
FIG. 18 illustrates a block diagram of the functional networking components of a hotspot device optimized for handling TCP traffic according to one or more embodiments of the present inventions.

An implementation of hotspot 150 that has been optimized for TCP performance is shown in FIG. 18. It is similar to the implementation in FIG. 5, but includes TCP interceptor module 314, configured to intercept all TCP connections originating from a wireless client (100 or 101) and addressed to the external internet. For example, TCP interceptions are easily implemented on Unix systems using the IPTABLES tool to redirect TCP traffic to a specified port. The intercepted packets are subsequently extracted by a listener process that is bound to this port, and forwarded to TUN device 312, now modified to receive and re-encapsulate these packets for forwarding to cloud server 190 via the multilink tunnel.

Figure 19:
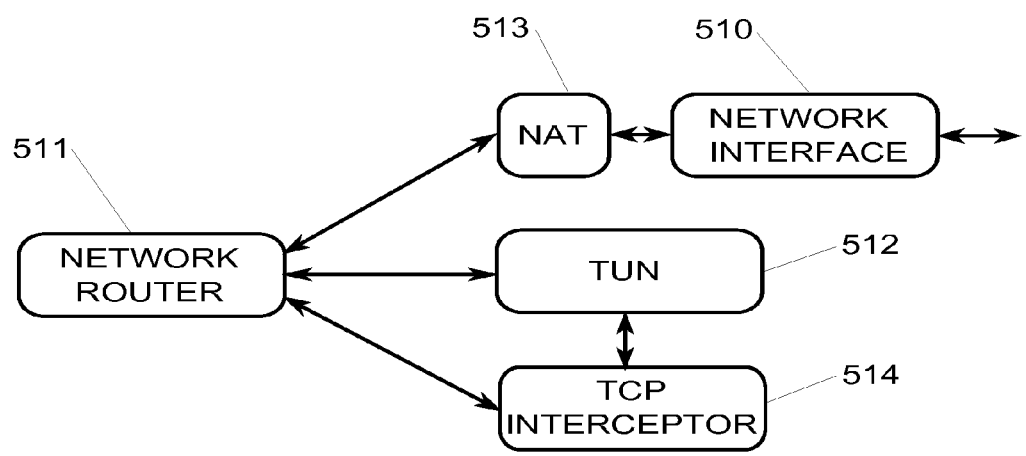
FIG. 19 illustrates a diagram of the functional networking components of a cloud server optimized for handling TCP traffic according to one or more embodiments of the present inventions.

An implementation of cloud server 190 that has been optimized for TCP performance is shown in FIG. 19. It is similar to the implementation in FIG. 9, but includes TCP interceptor module 514, configured to re-encapsulate data received from TUN device 512 for forwarding to a destination within the internet. Once a message has been intercepted and forwarded, a response message may be received while the socket connection remains established. TCP interceptor 514 receives this response and forwards it to TUN device 512, for forwarding back to hotspot 150 via the multilink tunnel. Similarly, the modified TUN device 312 on hotspot 150 is capable of receiving these response messages from the multilink tunnel and forwarding them to TCP interceptor 314. The response message is processed by TCP interceptor 314 and forwarded as a TCP stream to the intended client (100 or 101) via network router 311 and WiFi module 310.

Figure 20:
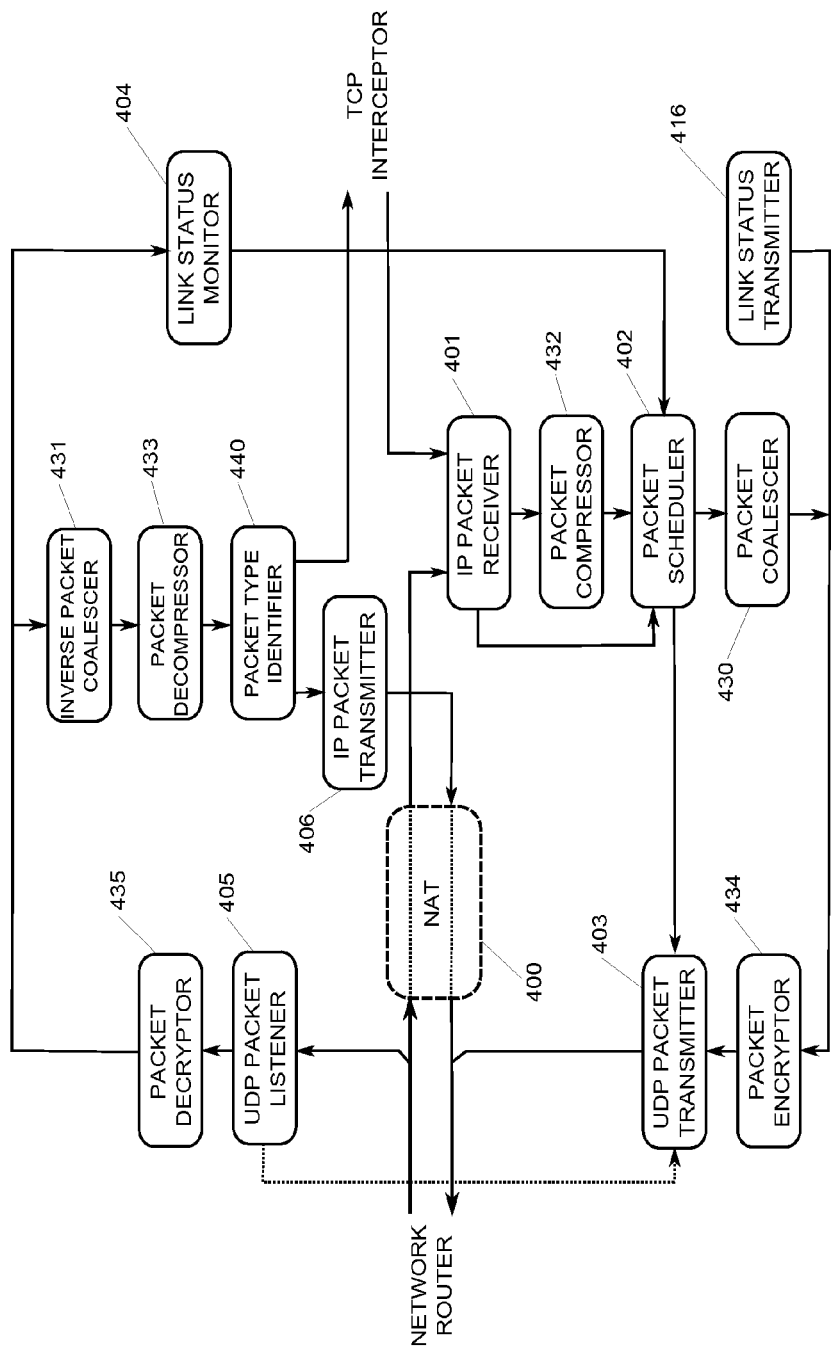
FIG. 20 illustrates a block diagram of the TUN module including support for TCP interception according to one or more embodiments of the present inventions.

An implementation of TUN module 312 or 512 modified to support inter-operation with TCP Interceptor 314 or 512 is shown in FIG. 20. IP packet receiver 401 is now configured to merge packets received from TCP interceptor (314 or 514) with packets received from network router 311 or 511 via NAT module 400 (if present). As before, the packets emitted by IP packet receiver 401 are optionally compressed by packet Compressor 432 and scheduled for transmission on the multilink tunnel by packet scheduler 402. At the same time, packets received from the multilink tunnel are received by UDP packet listener 405, and forwarded to packet type identifier module 440 via optional modules 435, 431, and 433. Packets identified as forwarded TCP packets are provided to TCP interceptor 314 or 514, while all other packets are provided to IP packet transmitter 406 for forwarding to network router 311 or 511 via NAT module 400 (if present).

Figure 21:
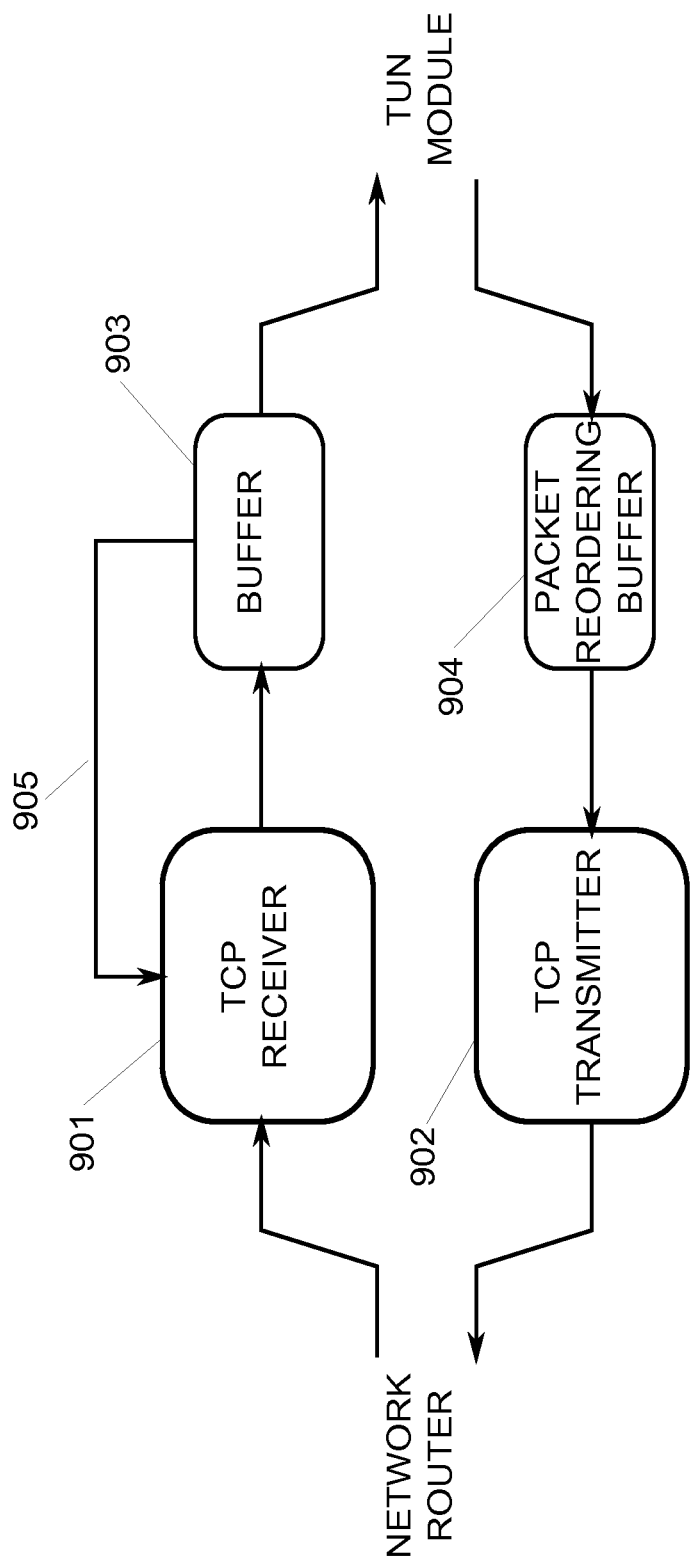
FIG. 21 illustrates a block diagram of the TCP Interceptor module according to one or more embodiments of the present inventions.

A block diagram of TCP interceptor 314 or 514 is shown in FIG. 21. Intercepted TCP packets are received from network router 311 or 511 by TCP receiver 901 where the packet payload is extracted, re-packetized, and stored in buffer 903 until they can be forwarded to TUN module 312 or 512. The buffer improves overall performance by allowing packets to continue being received while the TUN module is busy or unable to accept packets due to temporary congestion on the multilink tunnel. Buffer status signal 905 is provided back to TCP receiver 901 to indicate when the buffer is sufficiently full and no longer capable of accepting additional packets. In response to a buffer full signal, TCP receiver 901 will stop accepting TCP data from network router 311 or 511. Although this may result in packet loss as packets continue to arrive, the underlying TCP process will insure that the lost packets are re-transmitted.

At the same time, packets are received from TUN module 312 or 512 by packet reordering buffer 904. These packets may correspond to many different streams, and the individual packets of each stream must be forwarded to TCP transmitter 902 in the proper sequential order. Therefore for each stream, packet reordering buffer 904 must examine the sequence numbers embedded in the packet header, and delay forwarding until all preceding packets have been received and forwarded. This simplifies the implementation of TCP transmitter 902, which merely receives packets and immediately forwards the payload to network router 311 or 511, preferably using high-level networking software.

Figure 22:
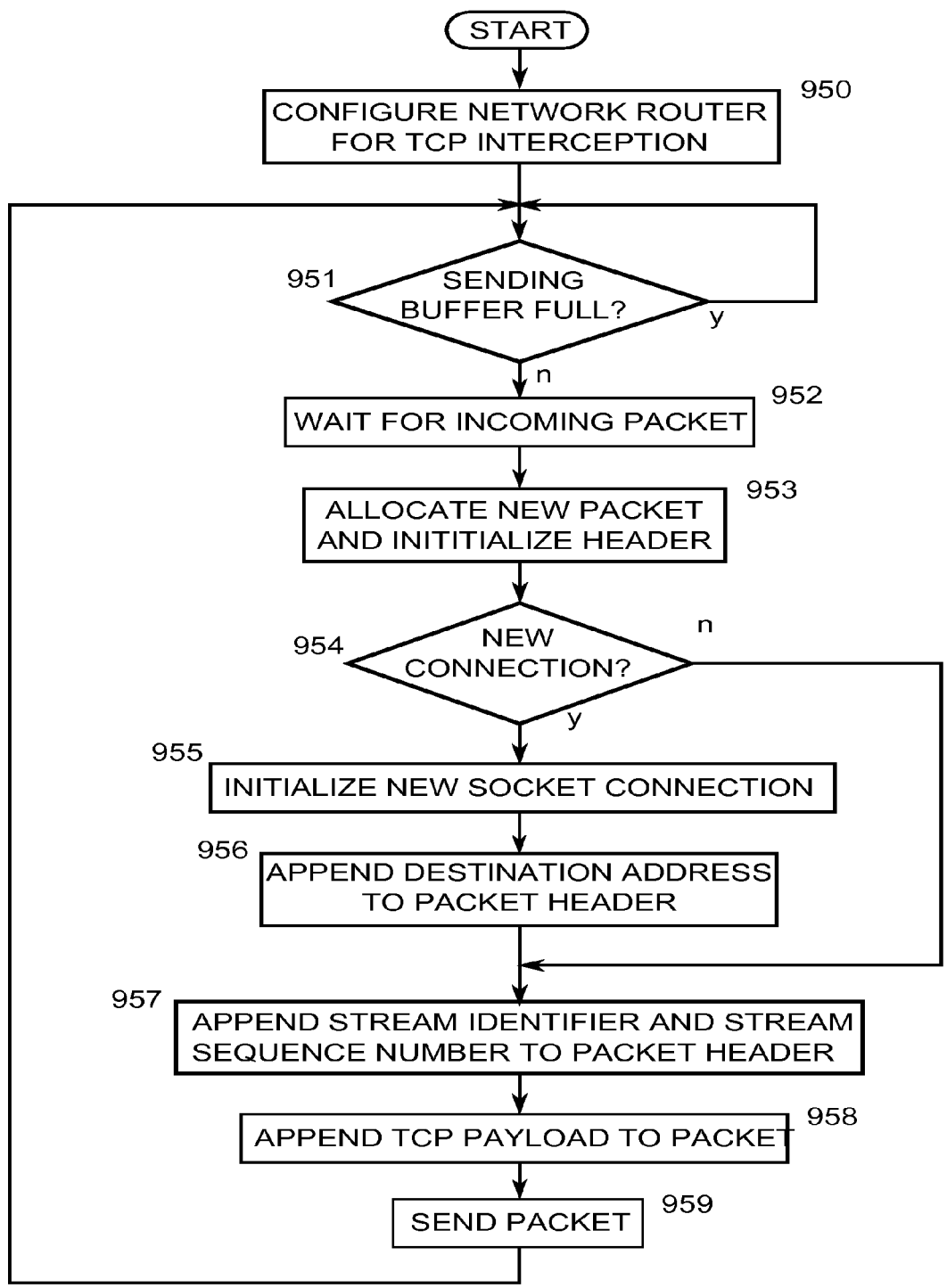
FIG. 22 illustrates a flow chart diagram of an exemplary TCP receiving process according to one or more embodiments of the present inventions.

A flowchart describing the operation of TCP receiver 901 is provided in FIG. 22. Network router 311 or 511 is first configured for TCP interception at step 950. For example, TCP interceptions are easily implemented on Unix systems using the IPTABLES tool for redirection to a specified port. If Buffer 903 is determined to be full at step 951, then the process waits, otherwise the process listens to the specified port and waits for the next incoming packet at step 952. In order to enable re-encapsulation, a new packet is allocated and packet header fields are assigned at step 953. If a new stream connection is identified at step 954, then the connection is initialized at step 955 and the destination address is determined and appended to the packet header at step 956. Although the destination address is not needed to intercept and terminate the connection here, it will be required to establish and complete the connection at the other end of the multilink tunnel. Although destination addresses are easily extracted from packet headers when networking processes are implemented as low level device drivers, the same information may not be readily accessible while running as a higher-level process in user space. Fortunately, software tools enabling access to low level networking information exist and may be used to extract the necessary information. For example, NFQUEUE is a software networking tool which may be configured to forward the first packet of each new TCP stream to a user-space application. The destination fields may then be extracted and appended to the packet header that was initialized at step 953.

The packet header must also include information to uniquely identify the network stream, not only after it has been forwarded to the receiving end of the multilink tunnel, but also to identify any subsequent response messages that may be returned and which will need to be forwarded to the corresponding network socket. TCP connections initiated by client devices 100 or 101 may be uniquely identified by the file descriptor of the corresponding socket connection on hotspot 150. Of course, the header must also include information such as a source IP address, if the source is to be uniquely identified on a cloud server which is servicing multiple hotspot devices. The unique identifier information and a packet sequence count associated with this stream are both appended to the header at step 957. The packet sequence counter is then incremented by one.

Finally the TCP packet payload is read from the incoming socket connection and appended to the new packet at step 958, and the fully formed packet is subsequently released at step 959. Note that the simple process of establishing socket connections and reading payload data is sufficient to terminate the TCP stream, while the details of lost packet recovery, packet reordering, congestion control, rate estimation, and packet acknowledgments are all handled by the underlying processes inherent in the networking stack of modern operating systems.

Figure 23:
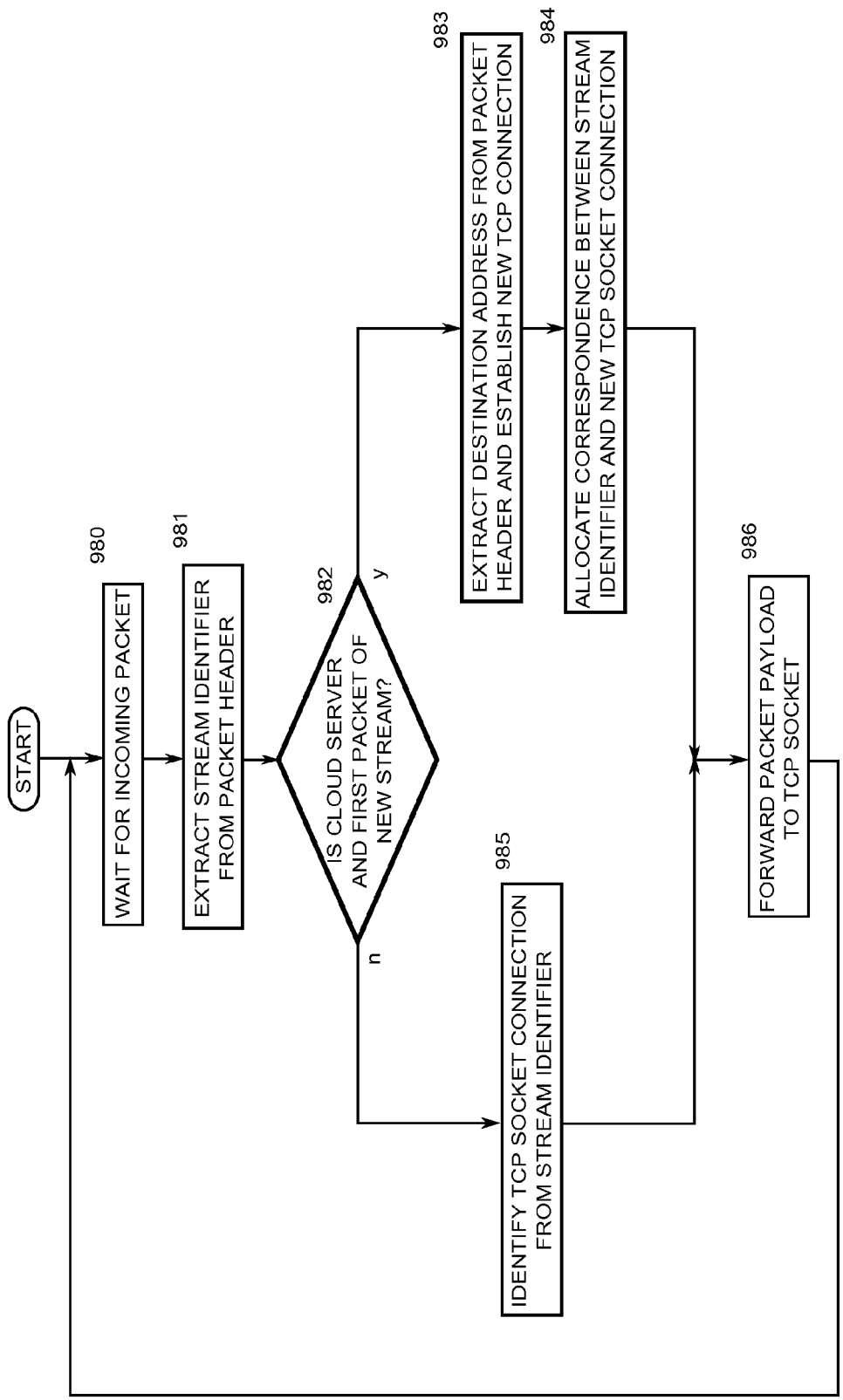
FIG. 23 illustrates a flow chart diagram of an exemplary TCP transmitting process according to one or more embodiments of the present inventions.

A flowchart describing the operation of TCP transmitter 902 is provided in FIG. 23. At step 980, the process waits for packets to be received from packet reordering buffer 904. The stream identifier is then extracted from the packet header at step 981. If the process is running on hotspot 150, then the decision at step 982 is determined to be false and flow proceeds to step 985. In this case, the TCP socket connection is directly specified by the stream identifier, and the packet is assumed to comprise a response to a message that was received previously on the same socket. However, if the process is running on cloud server 190, then it is determined at step 982 if this is the first packet of a new stream. This determination may be made by examining the stream identifier and the packet sequence number, both extracted from the packet header. It the packet is determined to be the first of a new stream, then a new TCP socket connection is established at step 983 to the destination address specified in the packet header. Then, at step 984, a correspondence is established between the stream identifier and the new TCP socket connection. This correspondence may be established in the form of a lookup table or hash function. The correspondence function is applied at step 985 to identify a corresponding TCP stream when the process running on the cloud server determines at step 982 that a packet is associated with a TCP stream that has already been established. Finally, at step 986, the packet payload is extracted and forwarded to the identified TCP socket. Control then returns to step 980, where the process waits for the next incoming packet.

Figure 24:
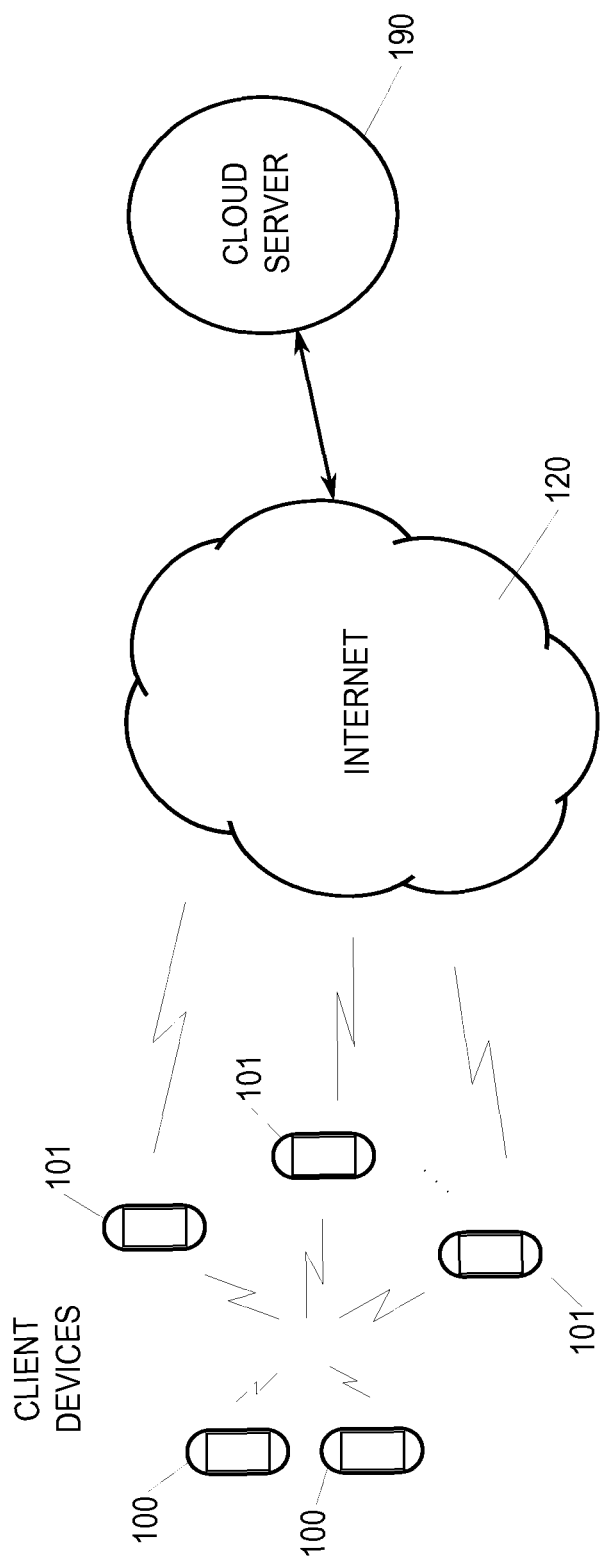
FIG. 24 illustrates a diagram of efficient and scalable implementation of the network in which the functions of the hotspot are shared among client devices according to one or more embodiments of the present inventions.

The hotspot device as described herein not only serves an important function as central manager of multiple client devices, but it is also a solution that is well suited to current technologies and well matched with the feature set offered by today's client devices. However, the methods and solutions that have been described will eventually be implementable on the client devices themselves without the inconvenience of maintaining an additional hardware unit. This is illustrated in FIG. 24, where the hotspot has been eliminated, and the client devices 101 now communicate among themselves in order to load balance the traffic on the multiple cellular connections to the internet and to offer Wi-Fi service to client devices 100 which are incapable of joining the bridge. Perhaps the first step in transitioning to this system is to elect a single client device to serve as the Wi-Fi access point. All other client devices would then join this Wi-Fi network and the elected client would perform all of the same functions previously allocated to hotspot 150 in FIG. 2. If the elected client subsequently leaves the network, or fails to perform its duties, then a different client 101 would be elected to take its place. This solution is also easily implemented with today's technology but faces certain challenges due to client device limitations relating to the programmable interfaces available to application developers.

Perhaps the most efficient and scalable implementation of the network in FIG. 24 is one in which all functions are shared among client devices 101. For example, it should not be necessary for all Wi-Fi messages to be forwarded to a single elected client device in order that the message be segmented and redistributed to multiple client devices before forwarding to the internet. Instead, once the internet link status of all clients 101 has been shared, it would be best for all clients to manage their own messages by segmenting and forwarding directly to selected client bridge devices. However, each of the client bridges 101 would be expected to receive response messages from the cloud server 190 which are intended for other clients and these packets would need to be forwarded to the intended recipients.

It is interesting to note that the cloud server could remain relatively unchanged as the client side evolves and the functions of the separate hotspot device are reassigned to a network of client devices. Certainly, it is possible that system designers will elect to transition certain implementation tasks from the client device to the cloud server, however, it is also possible that the reverse trend might prove popular and services which may have been performed by the cloud server will be transitioned to the much larger population of clients in order to improve scalability and overall system efficiency.

The signal processing techniques disclosed herein with reference to the accompanying drawings can be implemented on one or more digital signal processors or microprocessors. Nevertheless, such techniques could instead be implemented wholly or partially as hardwired circuits. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An apparatus for managing multipath communications between a first network and a second network, wherein the first network and the second network are wirelessly coupled therebetween by links through a plurality of wireless cellular devices, the apparatus comprising:
a network interface operatively coupled to said first network;
a network router operatively coupled to the network interface to forward open packets between the network interface, a packet receiver, and a packet transmitter;
wherein the packet receiver is operatively coupled to the network router to receive packets originating from the second network;

a link status monitor operatively coupled to the packet receiver to maintain a list of wireless cellular devices with bridging capability available for multipath communications between said first and second networks, wherein said list includes link quality information representative of a current quality of each link corresponding to a wireless cellular device; and a packet scheduler operatively coupled to the packet transmitter and the link status monitor to perform the steps of:

(a) receiving said list of wireless cellular devices from the link status monitor;

(b) identifying segments of packets that are received at the packet transmitter; and (c) assigning one or more wireless cellular devices selected from said list received in said step (a) to said segments identified in said step (b); and wherein the packet transmitter is operatively coupled to the network router and the packet scheduler to encapsulate said segments of packets identified by said packet scheduler and addressing the encapsulated segments to said assigned wireless cellular devices.

2. An apparatus according to claim 1, wherein the packet scheduler assigns a wireless cellular device to said identified segments by considering at least one factor from the group consisting of inferred packet priority, expected transmission latency, and inferred likelihood of successful delivery.

3. An apparatus according to claim 2, wherein the packet scheduler determines said inferred packet priority factor based on information included in a header of said packets received at the packet transmitter.

4. An apparatus according to claim 2, wherein the packet scheduler determines at least one of said expected transmission latency factor and said inferred likelihood of successful delivery factor based on said link quality information received from said link status monitor.

5. An apparatus according to claim 1, wherein the first network comprises a wireless network.

6. An apparatus according to claim 5, wherein a wireless hotspot comprises the aforementioned apparatus.

7. An apparatus according to claim 5, wherein at least one of the wireless cellular devices comprises the aforementioned apparatus.

8. An apparatus according to claim 5, wherein the second network comprises a wide area network.

9. An apparatus according to claim 1,
wherein the first network comprises a wide area network; and
wherein a cloud server comprises the aforementioned apparatus.

10. An apparatus according to claim 9, wherein the second network comprises a wireless network.

11. An apparatus according to claim 10, wherein said wide area network includes one or more cellular networks for communicating with said wireless cellular devices.

12. An apparatus according to claim 1, wherein the wireless cellular devices comprise smart phones.

13. An apparatus according to claim 1, wherein the link status monitor derives the current quality of links corresponding to the wireless cellular devices based on information associated with packets received from each of said links.

14. An apparatus according to claim 1, further comprising a packet interceptor operatively coupled to the network router and the packet transmitter to serve as a proxy for TCP streams originating from the first network and addressed to a destination in the second network.

15. An apparatus according to claim 14, wherein said packet interceptor comprises:

a TCP receiver operatively coupled to the network router to receive data from the network router in accordance with a TCP protocol; and a buffer operatively coupled to the packet transmitter to store output packets until they can be delivered to the packet transmitter.

16. An apparatus according to claim 1, further comprising a packet interceptor operatively coupled to the network router and the packet receiver to serve as a proxy for packets originating from TCP streams in the second network and addressed to a destination in the first network.

17. An apparatus according to claim 16, wherein said packet interceptor comprises:

a packet reordering buffer operatively coupled to the packet receiver to restore an original sequencing of packets received from the packet receiver to produce reordered packets when said packets are received in non-sequential order, and a TCP transmitter operatively coupled to the packet reordering buffer and the network router to send the reordered packets to the network router in accordance with a TCP protocol.

18. An apparatus according to claim 1, further comprising:
a packet compressor operatively coupled to said packet transmitter; and
a packet decompressor operatively coupled to said packet receiver.

19. An apparatus according to claim 1, wherein the packet scheduler in said step (b) identifies segments that are the same as the packets.

20. An apparatus according to claim 1, wherein the packet scheduler selects said segments identified in said step (b) from one or more of said packets received at said packet transmitter so that a size of the segments is fixed.

21. An apparatus according to claim 20, further comprising:
a packet striping module operatively coupled to said packet transmitter; and
a packet destriping module operatively coupled to said packet receiver.

22. A method of managing multipath communications between a first network and a second network, wherein the first network and the second network are wirelessly coupled therebetween by links through a plurality of wireless cellular devices, the method comprising the steps of:

(a) receiving packets originating from a source in the first network and addressed to a destination in the second network;

(b) maintaining a list of wireless cellular devices with bridging capability available for multipath communications between said first and second networks, wherein said list includes link quality information representative of a current quality of each link corresponding to a wireless cellular device;

(c) identifying segments of packets so received in said step (a);

(d) assigning one or more wireless cellular devices selected from said list maintained in said step (b) to said segments identified in said step (c);

(e) encapsulating said segments of packets identified in said step (c) and addressing the encapsulated segments to said assigned wireless cellular devices;

(f) transmitting the encapsulated segments so addressed to said assigned wireless cellular devices;

(g) receiving packets from the second network;

(h) extracting segments from the packets received in step (g); and (i) transmitting said extracted segments from step (h) to a destination on the first network.

23. A method according to claim 22, wherein the assigning of said step (d) comprises the substep of (d)(1) assigning a wireless cellular device to said identified segments by considering at least one factor from the group consisting of inferred packet priority, expected transmission latency, and inferred likelihood of successful delivery.

24. A method according to claim 23, wherein said substep (d)(1) determines said inferred packet priority factor based on information included in a header of said packets received in said step (a).

25. A method according to claim 23, wherein said substep (d)(1) determines at least one of said expected transmission latency factor and said inferred likelihood of successful delivery factor based on said link quality information maintained in said step (b).

26. A method according to claim 22, wherein the first network comprises a wireless network.

27. A method according to claim 26, wherein a wireless hotspot performs the aforementioned method.

28. A method according to claim 26, wherein at least one of the wireless cellular devices performs the aforementioned method.

29. A method according to claim 26, wherein the second network comprises a wide area network.

30. A method according to claim 22,
wherein the first network comprises a wide area network; and
wherein a cloud server performs the aforementioned method.

31. A method according to claim 30, wherein the second network comprises a wireless network.

32. A method according to claim 30, wherein said wide area network includes one or more cellular networks for communicating with said wireless cellular devices.

33. A method according to claim 22, wherein the wireless cellular devices comprise smart phones.

34. A method according to claim 22, wherein said step (b) of maintaining the list of wireless cellular devices with bridging capability available for multipath communications comprises the substep of (b)(1) deriving the current quality of links corresponding to the wireless cellular devices based on information associated with packets received from each of said links.

35. A method according to claim 22, wherein said receiving step (a) further comprises the substeps of:
(a)(1) intercepting and processing TCP packets as an endpoint destination in accordance with the TCP protocol;
(a)(2) repacketizing the TCP packets; and
(a)(3) bufferring the repacketized TCP packets until forwarded to said second network via said assigned wireless cellular devices.

36. A method according to claim 22, wherein said transmitting step (i) further comprises the substeps of:
(i)(1) identifying and reordering TCP data to restore its original sequential order;
(i)(2) transmitting the reordered TCP data to a destination on the first network in accordance with the TCP protocol.

37. A method according to claim 22, further comprising the steps of:
(j) compressing the segments of packets identified in step (c); and
(k) decompressing the segments of packets extracted in step (h).

38. A method according to claim 22, wherein said segments identified in step (c) are the same as the packets so received in said step (a).

39. A method according to claim 22, wherein the segments are identified in said step (c) such that a size of the segments is fixed.

40. A method according to claim 39, further comprising the steps of:
(j) striping said segments of packets identified in said step (c); and
(k) destriping said segments of packets extracted in said step (h).

* * * * *